US012231999B2

(12) United States Patent
Bharadwaj et al.

(10) Patent No.: US 12,231,999 B2
(45) Date of Patent: Feb. 18, 2025

(54) ROAD SIDE UNIT SCHEDULING SYSTEM

(71) Applicant: QUALCOMM Incorporated, San Diego, CA (US)

(72) Inventors: Arjun Bharadwaj, Poway, CA (US); Shailesh Patil, San Diego, CA (US); Naga Bhushan, San Diego, CA (US); Sudhir Kumar Baghel, Hillsborough, NJ (US); Hong Cheng, Bridgewater, NJ (US); Zhibin Wu, Sunnyvale, CA (US); Tien Viet Nguyen, Bridgewater, NJ (US); Kapil Gulati, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 16/566,377

(22) Filed: Sep. 10, 2019

(65) Prior Publication Data

US 2020/0107172 A1 Apr. 2, 2020

Related U.S. Application Data

(60) Provisional application No. 62/738,868, filed on Sep. 28, 2018.

(51) Int. Cl.
*H04W 4/44* (2018.01)
*H04W 72/0446* (2023.01)
(Continued)

(52) U.S. Cl.
CPC ......... *H04W 4/44* (2018.02); *H04W 72/0446* (2013.01); *H04W 72/23* (2023.01); *H04W 72/535* (2023.01); *H04W 92/18* (2013.01)

(58) Field of Classification Search
CPC ... H04W 72/1257; H04W 72/14; H04W 4/40; H04W 72/0446; H04W 72/1278; H04W 92/18; H04W 4/44; H04W 76/14
See application file for complete search history.

(56) References Cited

U.S. PATENT DOCUMENTS

2016/0338095 A1* 11/2016 Faurie ............... H04W 28/0278
2017/0006622 A1 1/2017 Baghel et al.
(Continued)

FOREIGN PATENT DOCUMENTS

CN 101500309 A 8/2009
CN 105657842 A 6/2016
(Continued)

OTHER PUBLICATIONS

CAICT: "Considerations on Resource Allocation of NR V2X Sidelink", 3GPP Draft; R1-1809287, 3rd Generation Partnership Project (3GPP), Mobile Competence Centre; 650, Route Des Lucioles; F-06921, Sophia-Antipolis Cedex; France, vol. RAN WG1, No. Gothenburg, Sweden; Aug. 20, 2018-Aug. 24, 2018, Aug. 10, 2018 (Aug. 10, 2018), 6 pages, XP051516651, Retrieved from the Internet: URL:http://www.3gpp.org/ftp/tsg%5Fran/WG1%5FRL1/TSGR1%5F94/Docs/R1%2D1809287%2Ezip.
(Continued)

*Primary Examiner* — Peter Chen
(74) *Attorney, Agent, or Firm* — Arent Fox, LLP

(57) ABSTRACT

Aspects of the present disclosure provide techniques for utilizing road side unit (RSU) that may be stationary units or mobile user equipments (UEs) (e.g., part of a vehicle) for managing scheduling requests from one or more UEs for side-link cellular vehicle-to-everything (CV2X) communication between UEs. To this end, an RSU may determine characteristics associated with the scheduling requests (e.g., traffic type, latency requirements, etc.) to allocate resources
(Continued)

in the resource pool to the one or more UEs that comply with the half-duplex constraints.

29 Claims, 13 Drawing Sheets

(51) Int. Cl.
    *H04W 72/23*         (2023.01)
    *H04W 72/50*         (2023.01)
    *H04W 92/18*         (2009.01)

(56) References Cited

U.S. PATENT DOCUMENTS

| | | | | |
|---|---|---|---|---|
| 2017/0086028 | A1* | 3/2017 | Hwang | H04W 72/02 |
| 2017/0094657 | A1* | 3/2017 | Yoon | H04W 72/0446 |
| 2017/0164377 | A1* | 6/2017 | Ho | H04W 16/28 |
| 2018/0049227 | A1* | 2/2018 | Moon | H04W 72/0446 |
| 2018/0076934 | A1* | 3/2018 | Huitema | H04L 1/1832 |
| 2018/0220448 | A1 | 8/2018 | Akkarakaran et al. | |
| 2018/0249448 | A1* | 8/2018 | Yasukawa | H04L 5/0048 |
| 2018/0255532 | A1 | 9/2018 | Li et al. | |
| 2019/0182896 | A1* | 6/2019 | Shrestha | H04W 88/06 |
| 2020/0178268 | A1* | 6/2020 | Duengen | H04W 72/121 |

FOREIGN PATENT DOCUMENTS

| | | |
|---|---|---|
| CN | 107534828 A | 1/2018 |
| CN | 107612666 A | 1/2018 |
| CN | 108307676 A | 7/2018 |
| WO | 2016131182 A1 | 8/2016 |
| WO | 2017004341 | 1/2017 |

OTHER PUBLICATIONS

International Search Report and Written Opinion—PCT/US2019/050642—ISA/EPO—Nov. 19, 2019.
Ericsson: "Scheduling Request in E-Utran", 3GPP TSG-RAN WG2 #47, R1-070471, Sorrento, Italy, Jan. 15-19, 2007, 11 Pages.
Ericsson: "Scheduling Request in E-Utran", 3GPP TSG-RAN WG2 #56, Tdoc R2-063215, Riga, Latvia, Nov. 6-10, 2006, pp. 1-8.
Ericsson: "Scheduling Request in E-Utran", 3GPP TSG-RAN WG2 #56bis, Tdoc R2-070056, Sorrento, Italy, Jan. 15-19, 2007, pp. 1-11.
Huawei., et al., "Improving the Trade-off Between SR Delay and Uplink Resource Usage", 3GPP TSG-RAN WG2 Meeting #77, R2-120503, Dresden, Germany, Feb. 6-10, 2012, pp. 3 Pages.
Motorola: "Scheduling Request using Contention Free Channel", R1-070780, 3GPP TSG RAN1#48, St. Louis, USA, Feb. 12-16, 2007, 4 Pages.
Spreadtrum Communications: "An Enhanced Scheduling Request Method for V2X", 3GPP TSG RAN WG1 meeting #84 bis, R1-162544, Busan, Korea, Apr. 11-15, 2016, 2 Pages.
Spreadtrum Communications: "Discussion on SR Enhancements for V2X", 3GPP TSG RAN WG1 meeting #85, R1-164580, Nanjing, China, May 23-27, 2016, 2 Pages.

\* cited by examiner

ROAD SIDE UNIT SCHEDULING SYSTEM

CROSS-REFERENCE TO RELATED APPLICATION(S)

This application claims benefit of U.S. Provisional Application Ser. No. 62/738,868, entitled "ROAD SIDE UNIT SCHEDULING SYSTEM" and filed Sep. 28, 2018, which is expressly incorporated by reference herein in its entirety.

BACKGROUND

The present disclosure relates to wireless communication systems, and more particularly, to road side unit (RSU) scheduling system in cellular vehicle-to-everything (CV2X) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In recent years, there has been significant focus on development and implementation of technologies for cellular vehicle-to-everything (CV2X) communication that may be implemented as part of the 5G NR technology deployment. In a CV2X system, vehicles or UEs within vehicles may directly communicate with other vehicles or other UEs by directing radio signals in specific directions. Because CV2X communication rely primarily on device-to-device (D2D) side-link communication, there may be a lack of centralized base station coordination for such communications. This lack of coordination may result in inefficient use of resources.

SUMMARY

Aspects of the present disclosure provide techniques for utilizing road side unit (RSU) that may be stationary units or mobile user equipments (UEs) (e.g., part of a vehicle) for managing scheduling requests from one or more UEs for side-link CV2X communication between UEs. To this end, an RSU may determine characteristics associated with the scheduling requests (e.g., traffic type, latency requirements, etc.) to allocate resources in the resource pool to the one or more UEs that comply with the half-duplex constraints.

In one example, a method for wireless communication is disclosed. The method may include receiving, at a RSU, a scheduling request for resources from a first UE for side-link communication with a second UE. The method may further include determining at least one characteristic associated with the scheduling request, and allocating resources in a resource pool to the first UE based on determining the at least one characteristic associated with the scheduling request. The method may further include transmitting a scheduling grant identifying the allocated resources, wherein the scheduling grant indicates to the first UE the allocated resources in the resource pool that the first UE is to utilize for transmissions of packets for side-link communication to the second UE.

In another example, an apparatus for wireless communication comprising a memory configured to store instructions and a processor communicatively coupled with the memory. The processor may be configured to execute instructions to receive, at a RSU, a scheduling request for resources from a first UE for side-link communication with a second UE. The processor may further be configured to execute instructions to determine at least one characteristic associated with the scheduling request, and allocating resources in a resource pool to the first UE based on determining the at least one characteristic associated with the scheduling request. The processor may further be configured to execute instructions to transmit a scheduling grant identifying the allocated resources, wherein the scheduling grant indicates to the first UE the allocated resources in the resource pool that the first UE is to utilize for transmissions of packets for side-link communication to the second UE.

In another example, a non-transitory computer readable medium storing instructions, executable by a processor, for wireless communications is disclosed. The non-transitory computer readable medium may include instructions for receiving, at a RSU, a scheduling request for resources from a first UE for side-link communication with a second UE. The non-transitory computer readable medium may further include instructions for determining at least one characteristic associated with the scheduling request, and allocating resources in a resource pool to the first UE based on determining the at least one characteristic associated with the scheduling request. The non-transitory computer readable medium may further include instructions for transmitting a scheduling grant identifying the allocated resources, wherein the scheduling grant indicates to the first UE the allocated resources in the resource pool that the first UE is to utilize for transmissions of packets for side-link communication to the second UE.

In another example, an apparatus for wireless communications is disclosed. The apparatus may comprise means for receiving, at a RSU, a scheduling request for resources from a first UE for side-link communication with a second UE. The apparatus may further comprise means for determining at least one characteristic associated with the scheduling request, and allocating resources in a resource pool to the first UE based on determining the at least one characteristic associated with the scheduling request. The apparatus may further comprise means for transmitting a scheduling grant identifying the allocated resources, wherein the scheduling grant indicates to the first UE the allocated resources in the resource pool that the first UE is to utilize for transmissions of packets for side-link communication to the second UE.

In another example, another method for wireless communication is disclosed. The method may include receiving, at a RSU, scheduling requests for resources from one or more UEs for side-link communication. The method may further include partitioning a set of resources in a resource pool of a frame into a plurality of virtual frames, wherein each virtual frame of the plurality of virtual frames corresponds to a transmission time interval (TTI) of frequency resources in the resource pool. The method may further include allocating the plurality of virtual frames to the one or more UEs based on the scheduling requests. The method may further include transmitting scheduling grant associated with the allocation to the one or more UEs, wherein the scheduling grant indicates to the one or more UEs the virtual frame allocated to the one or more UEs for side-link communication.

In another example, an apparatus for wireless communication comprising a memory configured to store instructions and a processor communicatively coupled with the memory. The processor may be configured to execute instructions to receive, at a RSU, scheduling requests for resources from one or more UEs for side-link communication. The processor may further be configured to execute instructions to partition a set of resources in a resource pool of a frame into a plurality of virtual frames, wherein each virtual frame of the plurality of virtual frames corresponds to a TTI of frequency resources in the resource pool. The processor may further be configured to execute instructions to allocate the plurality of virtual frames to the one or more UEs based on the scheduling requests. The processor may further be configured to execute instructions to transmit scheduling grant associated with the allocation to the one or more UEs, wherein the scheduling grant indicates to the one or more UEs the virtual frame allocated to the one or more UEs for side-link communication.

In another example, a non-transitory computer readable medium storing instructions, executable by a processor, for wireless communications is disclosed. The non-transitory computer readable medium may include instructions for receiving, at a RSU, scheduling requests for resources from one or more UEs for side-link communication. The non-transitory computer readable medium may further include instructions for partitioning a set of resources in a resource pool of a frame into a plurality of virtual frames, wherein each virtual frame of the plurality of virtual frames corresponds to a TTI of frequency resources in the resource pool. The non-transitory computer readable medium may further include instructions for allocating the plurality of virtual frames to the one or more UEs based on the scheduling requests. The method may further include transmitting scheduling grant associated with the allocation to the one or more UEs, wherein the scheduling grant indicates to the one or more UEs the virtual frame allocated to the one or more UEs for side-link communication.

In another example, an apparatus for wireless communications is disclosed. The apparatus may comprise means for receiving, at a RSU, scheduling requests for resources from one or more UEs for side-link communication. The apparatus may further comprise means for partitioning a set of resources in a resource pool of a frame into a plurality of virtual frames, wherein each virtual frame of the plurality of virtual frames corresponds to a TTI of frequency resources in the resource pool. The apparatus may further comprise means for allocating the plurality of virtual frames to the one or more UEs based on the scheduling requests. The apparatus may further comprise means for transmitting scheduling grant associated with the allocation to the one or more UEs, wherein the scheduling grant indicates to the one or more UEs the virtual frame allocated to the one or more UEs for side-link communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

As discussed above, in recent years, there has been significant focus on development and implementation of technologies for CV2X communication that may be implemented as part of the 5G NR technology deployment. In a CV2X system, vehicles or UEs within vehicles, may directly communicate with other vehicles or other UEs by directing radio signals in specific directions. Because CV2X communication rely primarily on D2D side-link communication, there may be a lack of centralized base station coordination for such communications. This lack of coordination may result in inefficient use of resources. Thus, in some instances, multiple UEs may be transmitting on overlapping resources or during same time period thereby violating half-duplex constraints.

Aspects of the present disclosure provide techniques for utilizing RSU that may be stationary units or mobile UEs (e.g., part of a vehicle) for managing scheduling requests from one or more UEs for side-link CV2X communication between UEs. To this end, an RSU may determine characteristics associated with the scheduling requests (e.g., traffic type, latency requirements, etc.) to allocate resources in the resource pool to the one or more UEs that comply with the half-duplex constraints. Although the terms "road side," "roadside," or the like are part of the terminology used herein for the example RSUs, it should be understood that an actual deployment of such devices need not necessarily require that such devices be located at or even nearby a side of a road, or the like. Instead, it should be understood that such terms are intended to indicate a function or capability rather than an intended location.

Various aspects are now described in more detail with reference to the FIGS. 1-10. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
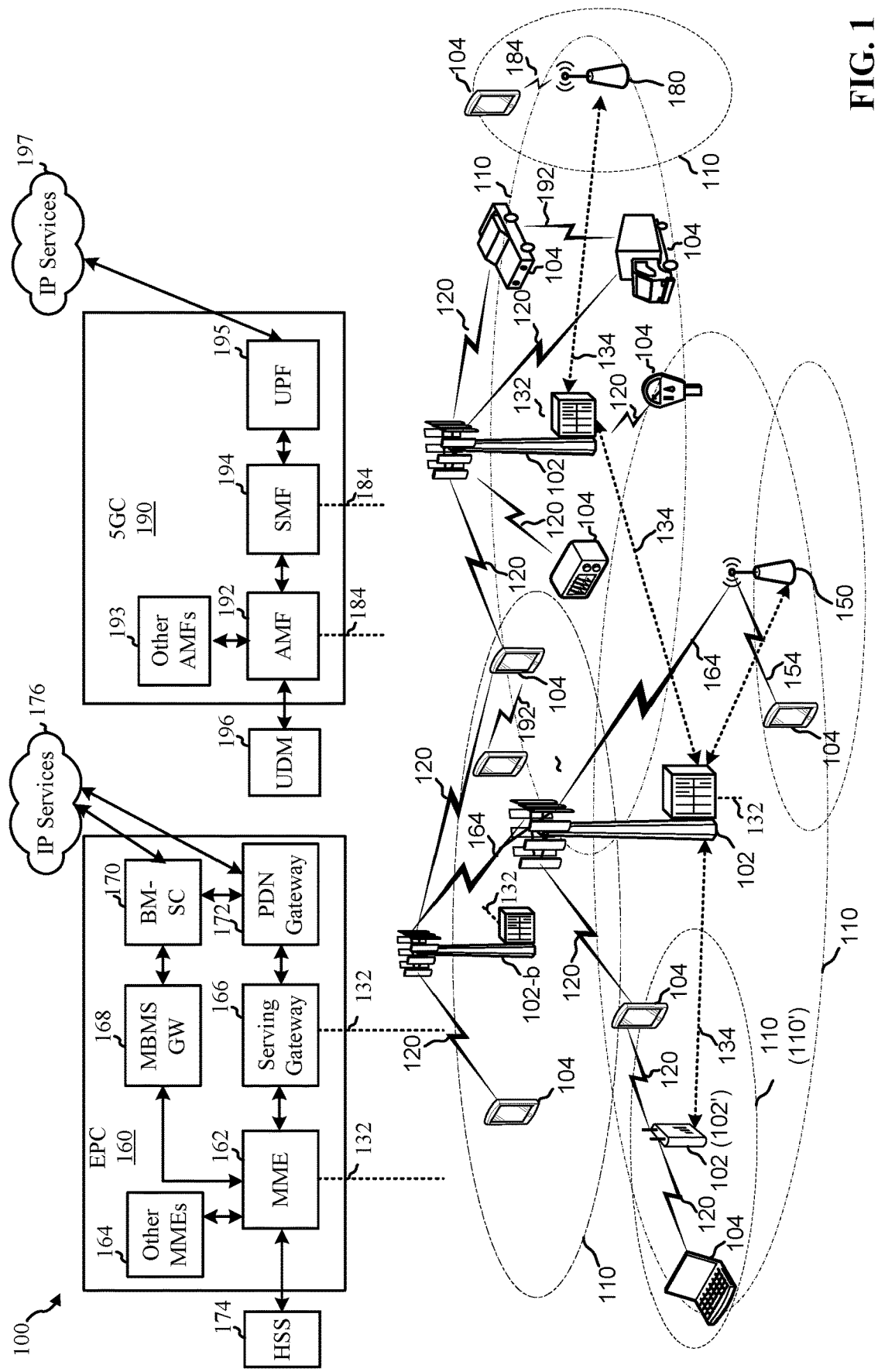
FIG. 1 is a schematic diagram of an example of a wireless communications system in accordance with aspects of the present disclosure.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104 may advertise CV2X services supported by the host UE 104. A client UE 104 may also discover CV2X services supported by the host UE 104.

Figure 2:
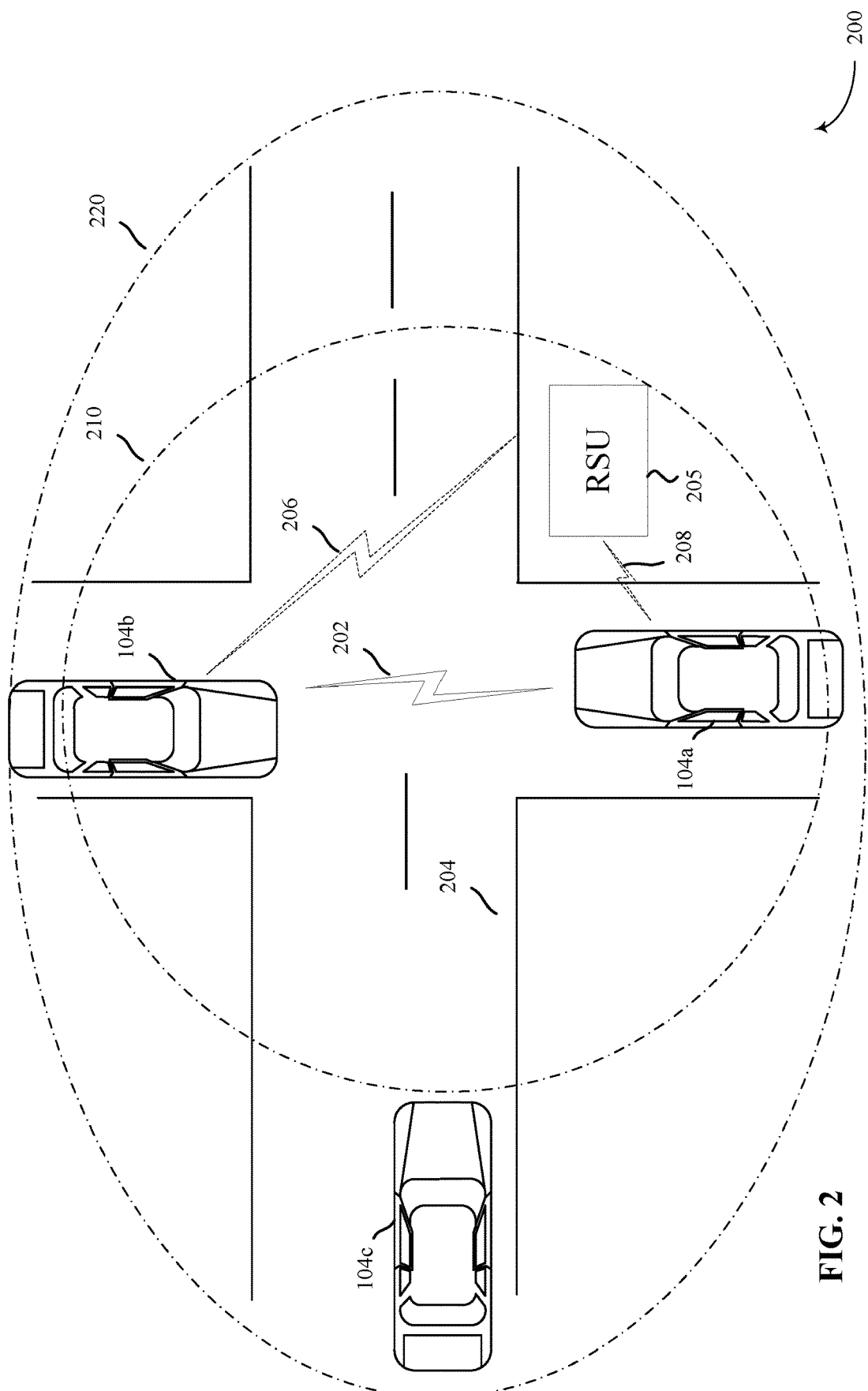
FIG. 2 is an example scenario for implementing an RSU in accordance with aspects of the present disclosure.

FIG. 2 is an example scenario 200 for implementing an RSU 205 in accordance with aspects of the present disclosure. In CV2X communication one or more UEs 104 may directly communicate with other UEs 104 without the need to route the data via a base station (not shown). Thus, in some instance, a first UE 104-*a* may directly transmit packets to a second UE 104-*b* by directing radio signals 202 in specific directions. While communication between two UEs 104 alone may be simple, managing resources may become more complicated when the same intersection or area becomes more congested with more UEs 104 participating in CV2X communication.

In such instances, number of UEs 104 may be ad-hoc contending for limited resources by selecting and transmitting packets in a congested network to other UEs in side-link communication. Such congestion may result in multiple UEs 104 transmitting at the same time (e.g., on different sub-bands) and/or on the same resources, thereby causing packet collisions.

Features of the present disclosure address the above-identified problem by implementing RSUs 205 to manage scheduling requests and resources for side-link communication between multiple UEs (e.g., for communication between first UE 104-*a* and second UE 104-*b*). In some examples, RSUs 205 may be implemented as stationary units (e.g., as part of the road side units, traffic lights, etc.) or as part of one of the UEs 104 that may act as a coordinator. To this end, the RSU 205, may receive scheduling requests (in communications 206/208) from one or more UEs 104 for resources for side-link communication. In turn, the RSU 205 may allocate resources in the resource pool based on the requested traffic type and latency requirements of the traffic and the UE to each requesting UE 104. The RSU 205 may issue scheduling grants identifying the allocated resources to the one or more UEs 104 such that the UEs 104 may utilize the allocated resources for the side-link communication.

In some instances, UEs 104 may register with the RSU 205 to utilize a scheduling management system. The availability of the RSU 205 may be signaled or advertised by the RSU. In other examples, the UEs 104 may maintain a database of RSU locations in a region and can be obtained dynamically as UEs 104 move into different region. The UEs 104 may begin registering and communicating with the RSU 205 as the one or more UE 104 move into the RSU 205 coverage area 220.

In some examples, the coverage area 220 of the RSU 205 (or RSU coverage zones) may be asymmetric to the coverage area 210 of the UE 104 due to differences in transmission power of the RSUs 205 and UEs 104. Specifically, RSU 205 to the UE 104 transmission power may be greater than the transmission power from UE 104 to the RSU 205. Thus, in some instances, while an RSU 205 may be able to transmit signals, and thus signal its availability to a wider coverage area 220, UEs 104 (e.g., third UE 104-c) may not be able to transmit scheduling requests to the RSU 205 until it is within the coverage area 210 of the UE 104 to transmit to RSU 205.

Figure 3:
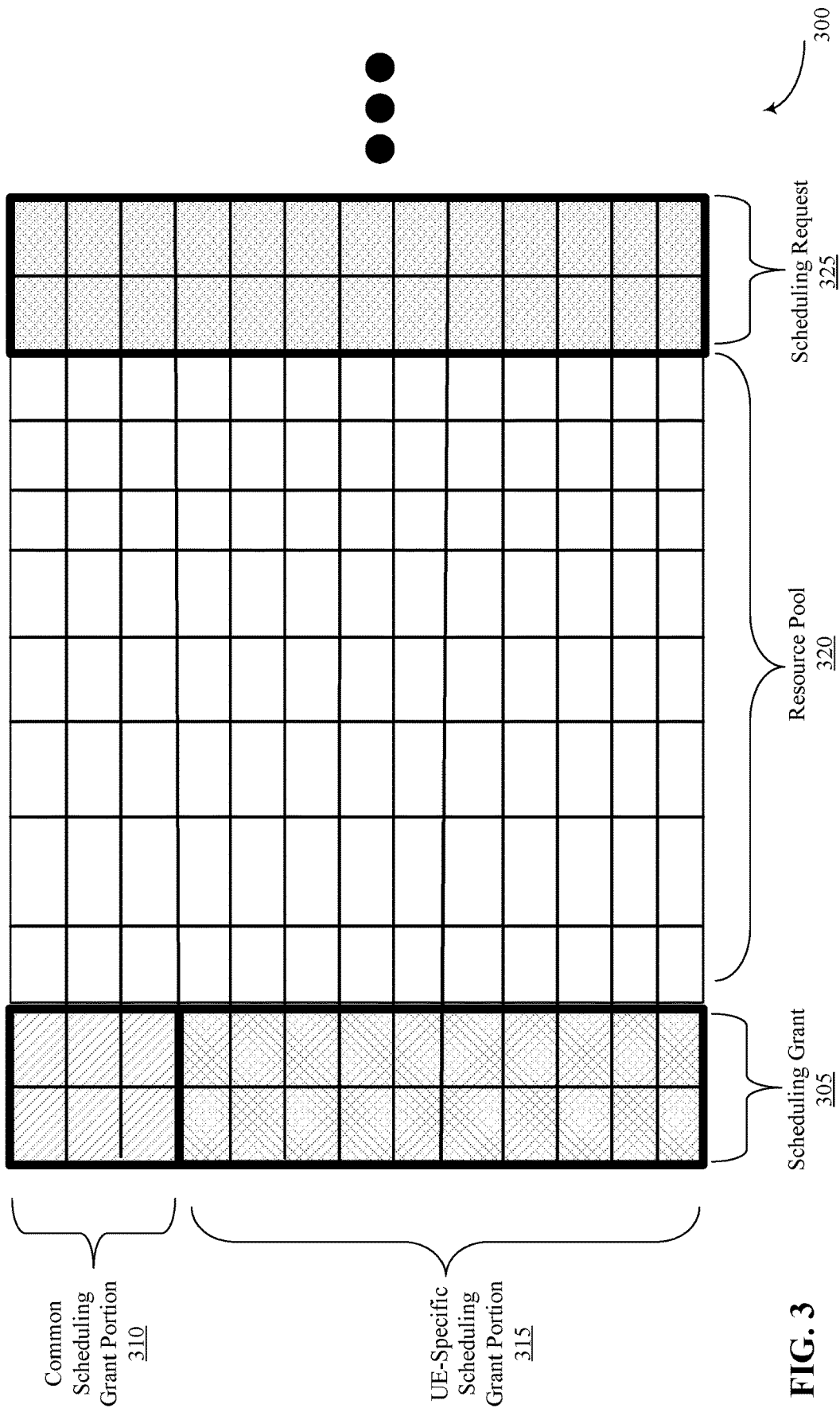
FIG. 3 is an example of an RSU scheduling frame structure in accordance with aspects of the present disclosure.

FIG. 3 is an example of an RSU scheduling frame structure 300 in accordance with aspects of the present disclosure. In some examples, in order to facilitate efficient side-link communication between multiple UEs 104 in CV2X context for instance, an RSU 205 may receive and process scheduling requests 325 from one or more UEs 104 from previous frame for subsequent frame. In some examples, the RSU scheduling frame structure 300 as illustrated in FIG. 3 may be continuously repeated between multiple UEs 104 and the RSU 205. As such, one or more UEs 104 may issue a scheduling request in the scheduling request portion 325 of a previous frame for allocation of resources in the subsequent frame (e.g., illustrated frame).

The RSU scheduling frame structure 300 may include a scheduling grant portion 305 portion that may include one or more TTIs of the frame. The scheduling grant portion 305 may include a common scheduling grant portion 310 that may be common to all UEs 104, and thus may be decoded by all the UEs for control information. The scheduling grant portion 305 may also include a UE-specific (or UE-dedicated) scheduling grant portion 315 that may be specific to each UE 104 that may issue a resource grant. In some examples, the RSU 205 may determine the type of traffic (e.g., fixed or variable packet size, latency requirements of the traffic and UE, etc.) to allocate resources in the resource pool 320 as discussed in detail below.

Figure 4:
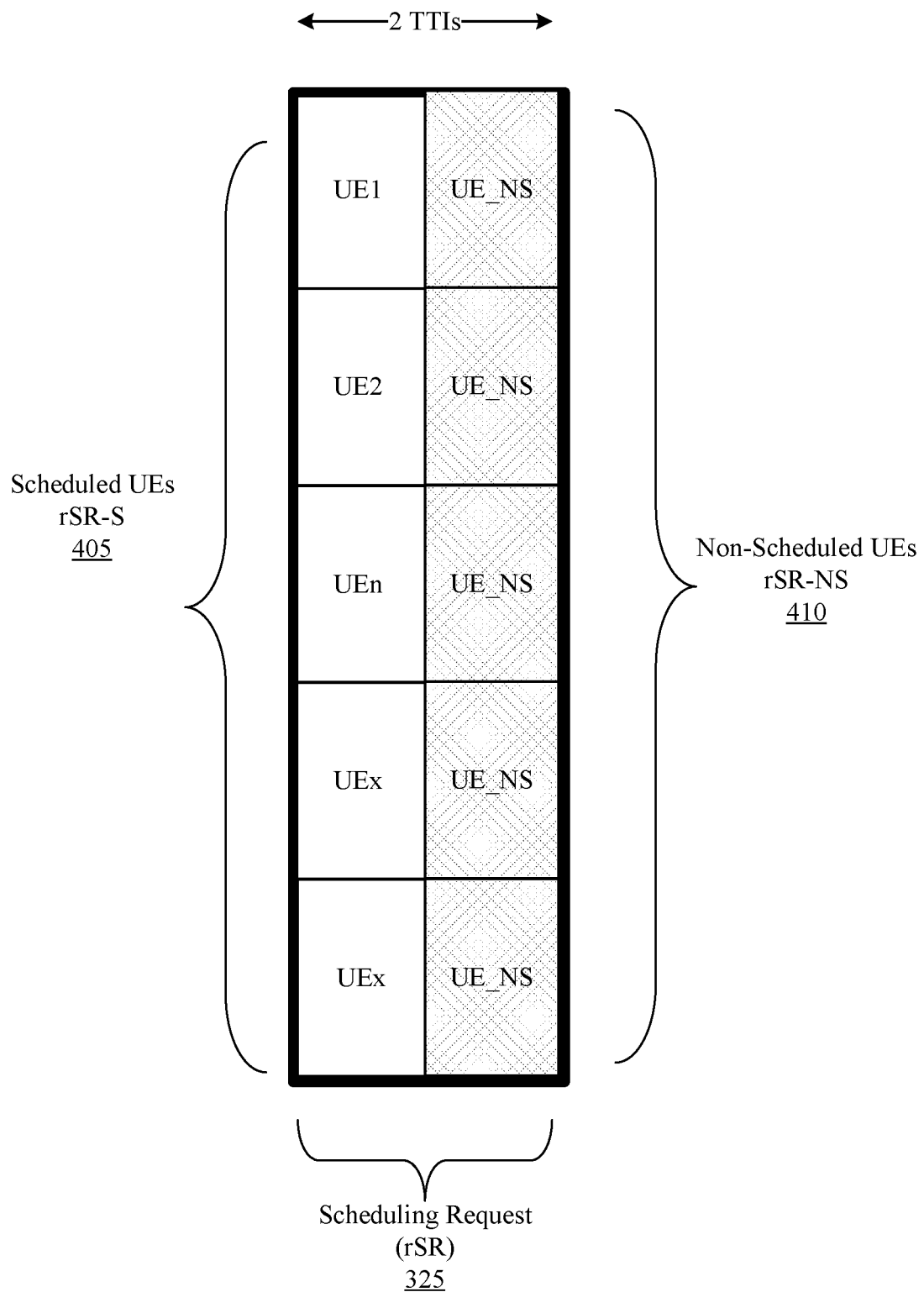
FIG. 4 is an example of a scheduling request design architecture in accordance with aspects of the present disclosure.

FIG. 4 is an example of a scheduling request design architecture 400 in accordance with aspects of the present disclosure. In some examples, resource scheduling requests (rSRs) 325 may occupy two TTIs in the entire frame, and may be split into two types. The first type may be requests from UEs 104 that are being scheduled (e.g., rSR-S) and the second type may be requests from UEs 104 that have not been scheduled (e.g., rSR-NS). Specifically, as noted above, in some instances, one or more UEs 104 or vehicles may be in coverage area of the RSU 205, while other UEs 104 may be outside the coverage area of the RSU 205. Similarly, some UEs 104 may have previously been scheduled with resources.

Thus, for UEs 104 that have previously been scheduled or are in the coverage area of the RSU 205, such UEs 104 may utilize resources reserved in the scheduling request portion 405 to issue new scheduling requests. The rSR-S may follow the same ordering as the rSG indication. Further, because the UEs 104 have been scheduled, the ordering may be known from prior scheduling. Additionally, scheduled UEs rSR-S 405 may benefit from contention-free issuance of scheduling requests to the RSU 205.

In contrast, the non-scheduled UEs rSR-NS 410 may use listen before talk (LBT) structure to content for resources in the second portion of the scheduling request 325. Thus, in some instances, dedicated resources may be made available for rSR-NS transmissions. Non-scheduled UEs may also use resources that may be left unutilized by scheduled UEs (e.g., UEs that may have left the coverage area of the RSU) by using LBT counter in order to utilize any resource gaps.

Figure 5A:
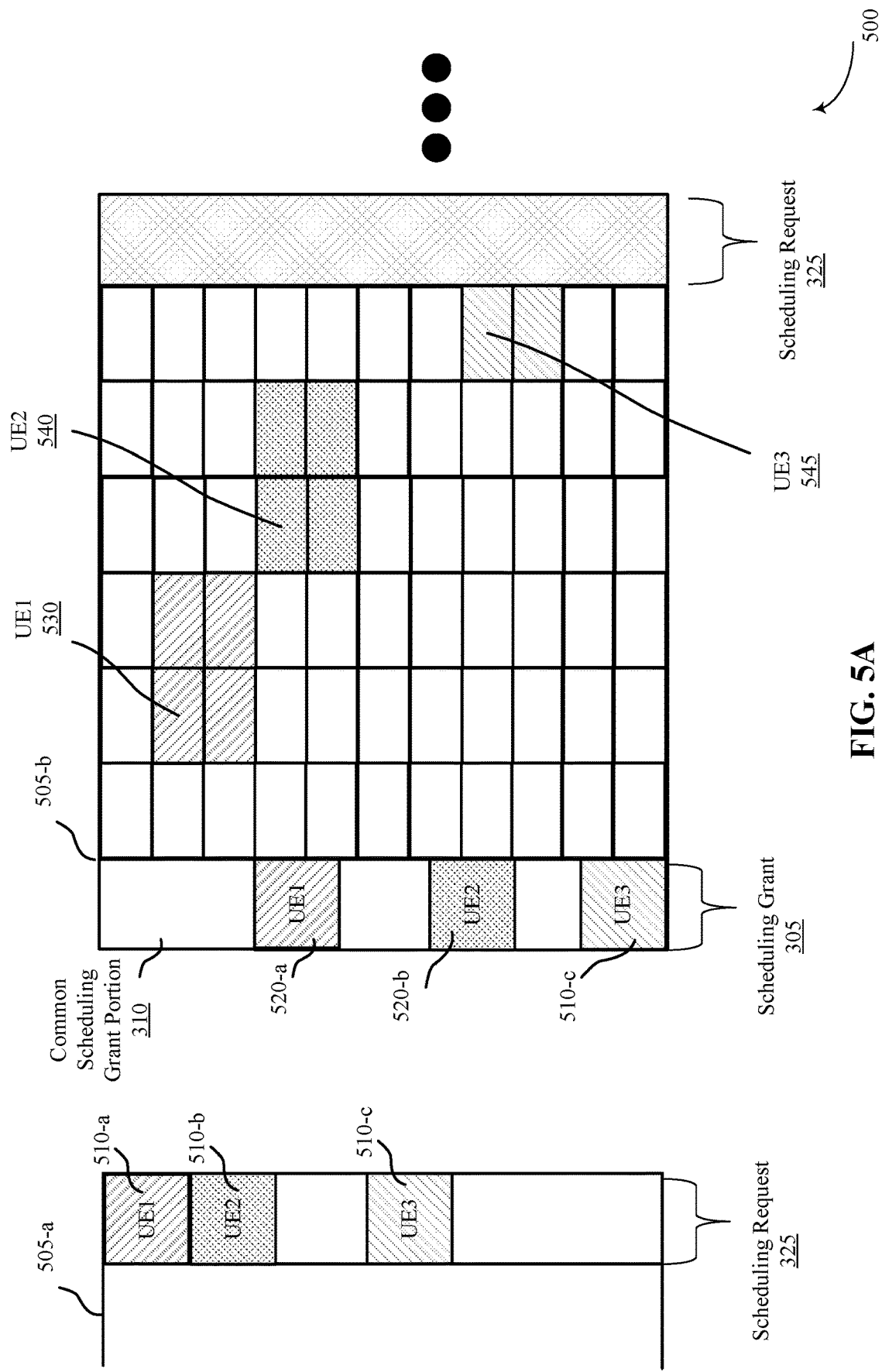
FIGS. 5A-5D are an example of diagrams of scheduling resources for side-link communication by RSU for various traffic patterns.

FIG. 5A is an example of a diagram 500 of scheduling resources for side-link communication by RSU for various traffic patterns. As illustrated, one or more frames may be transmitted and/or received by the UEs 104 and the RSU 205 to facilitate side-link communication for CV2X communication. In one instance, one or more UEs 104 may issue scheduling requests 510 (e.g., by UE1, UE2, and UE3) during a scheduling request portion 325 of the first frame 505-a.

In turn, upon receiving the scheduling requests 510, the RSU 205 may determine at least one characteristic associated with the scheduling request (e.g., type of traffic, latency requirements of the UEs, etc.) and issue scheduling grant in the scheduling grant portion 305 of the second frame 505-b. As noted above, the scheduling grant portion 305 may include a common scheduling grant portion 310 (e.g., first portion) that may be common for all UEs issuing requests (e.g., UE1, UE2, UE3) and second portion that is UE-dedicated portion to be specifically decoded by the intended recipient UE 104. Specifically, the RSU 205 may allocate resources (e.g., resource blocks) in the resource pool 320 (see FIG. 3) based on the type of traffic and latency requirements. In some examples, the RSU 205 may allocate resources in the resource pool 320 such that resources are distributed in the time domain to satisfy half-duplex constraints of the UEs 104. Specifically, half-duplex constraint prevents multiple UEs 104 from transmitting concurrently. This is because if the first UE 104 is transmitting at the same time as the second UE 104, neither the first UE 104 nor the second UE 104 would be able to hear or receive the transmission of the other during the period each is performing its own transmission. In side-link communication, especially for CV2X communication, it may be important to ensure that transmitted communication is received by the intended UEs 104. Thus, to accommodate the half-duplex constraints, the RSU 205 may allocate and organize resources to the one or more UEs 104 in the time domain in a manner that ensures that no two UEs 104 transmit during the same time period or TTI in different sub-bands.

In the illustrated example, the one or more UEs 104 may issue scheduling requests for transmissions of fixed packet size and a latency requirements (e.g., 100 ms latency) that satisfy the latency threshold (e.g., non-urgent packets). Because the UEs 104 may be scheduled to transmit a fixed packet size data for a specified time interval, the RSU 205, in some instances, may be configured to allocate fixed resources to the UEs 104. For example, the RSU 205 may allocate a first set of fixed resources 530 to the first UE 104-a based on first scheduling request 510-a issued in first scheduling grant 520-a. Similarly, the RSU 205 may allocate a second set of fixed resources 540 to the second UE 104-b based on second scheduling request 510-b issued in the third scheduling grant 520-b. Finally, the RSU 205 may allocate a third set of fixed resources 545 to the third UE 104-c based on third scheduling request 510-c issued in the third scheduling grant 520-c.

While each of the allocated resources (e.g., first resources 530, second resources 540, third resources 545) may be of varying sizes (e.g., first resources 530 includes four resource blocks and third resource 540 includes two resource blocks) depending on the packet size transmission requested by corresponding UEs 104, each of the resources may be fixed for subsequent number of frames such that the UEs 104 may omit having to repeatedly request resources. Thus, for example, if a first UE 104 needs to transmit same size packets for ten continuous frames to a second UE 104 in side-link communication, the RSU 205 may be configured to allocate fixed resources in the resource pool with a single scheduling grant that alleviates the need for the UE 104 to continuously request additional resources for each frame.

Figure 5B:
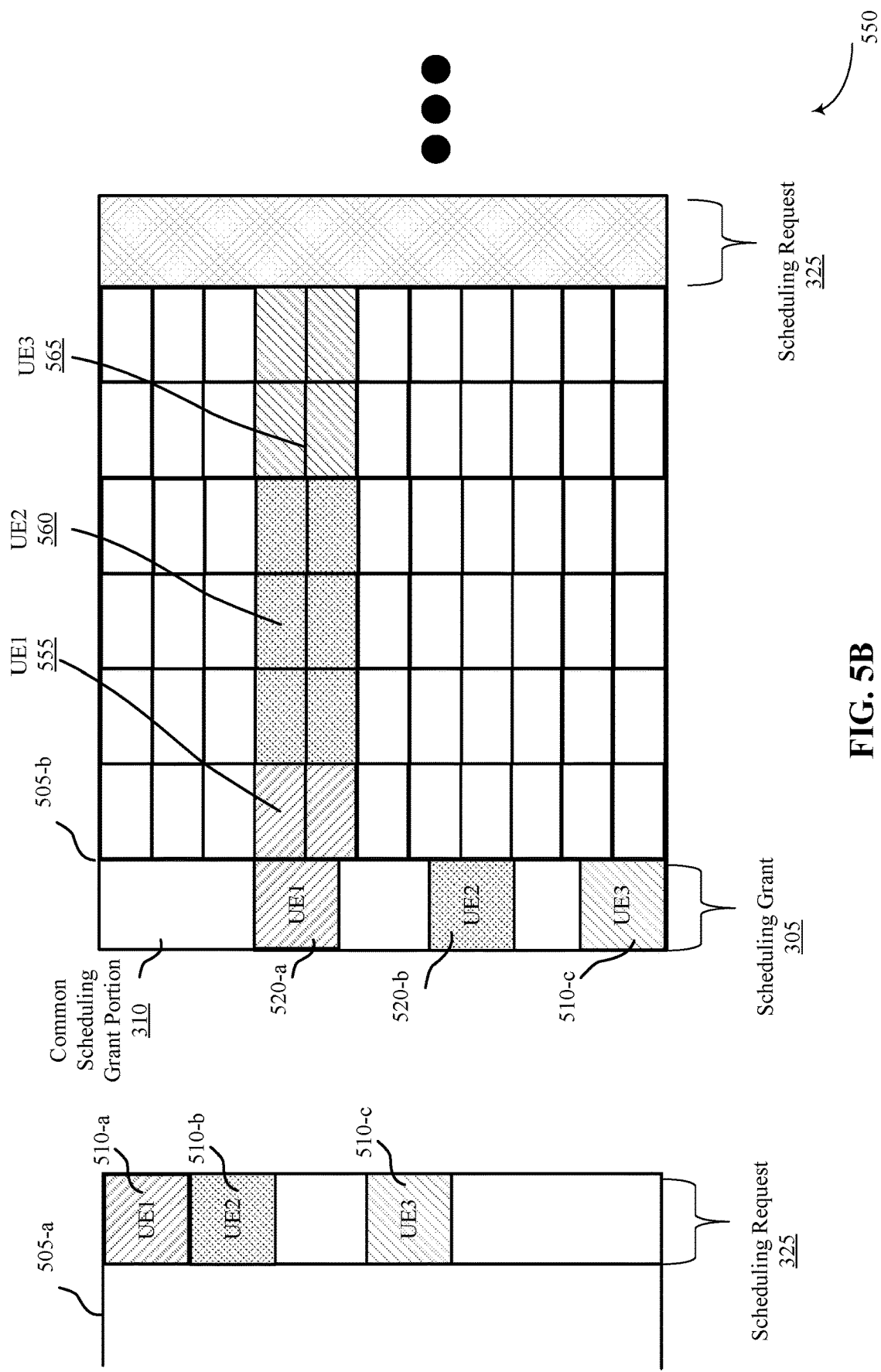

FIG. 5B is another example of a diagram 550 of scheduling resources for side-link communication by RSU for various traffic patterns. As discussed above, the RSU 205, may be configured to allocate resources in the resource pool to one or more UEs 104 in response to scheduling requests based on characteristics of the scheduling requests, including the traffic type, latency requirements of the traffic or the UE 104. While FIG. 5A above illustrates an example of fixed packet size traffic type, the diagram 550 in FIG. 5B is an example of resource allocation for a requests for variable packet sizes.

As with FIG. 5A above, one or more UEs 104 may issue a scheduling request 510 in a scheduling request portion of a frame 505-a for resources in subsequent frame 505-b. The RSU 205, upon receiving the scheduling requests may determine the traffic type and the latency requirements of the traffic and the UE 104 in allocating resources. If the RSU 205 determines that the traffic request is for variable packet size, the RSU 205 may order the allocation of resources in time domain in same sub-band (e.g., to maintain half-duplex constraints) for the one or more UEs 104. For example, for a specific sub-band, the RSU may allocate the first TTI resources 555 to the first UE 104-a, second TTI resources 560 to the second UE 104-b, and third TTI resources 565 to the third UE 104-c.

In some examples, the UEs may vary allocation sizes dynamically depending on the traffic. However, the order in which the UEs 104 may transmit may be strictly maintained as specified by the RSU 205. In other words, while one or more UEs 104 may utilize more or less time on the sub-band for packet transmission, the order in which it would transmit (e.g., the second UE 104-b would follow first UE 104-a) would be maintained. Thus, UEs 104 that may run out of resources for corresponding transmission, may use the rest of the spectrum for transmission by utilizing listen before talk (LBT) procedures to reduce collisions. In some instances, unused resources can also be used by other UEs 104 by implementing LBT.

Additionally or alternatively, in some examples, the RSU 205 may be configured to partition the resource pool into one or more virtual frames. For example, a resource pool of 100 ms may be partitioned into ten virtual frames of 10 ms each. Thus, in some instances, the RSU 205 may order allocation of resources for the UEs based on UE identifications (IDs) based on their respective latency requirements. Thus, for UEs 104 that may have a lower latency requirements may be scheduled more often in the virtual frames than UEs that have higher latency requirements. For instance, for a 100 ms resource pool, where first UE (UE1) and second UE (UE2) have latency requirements of 20 ms, third UE (UE3) and fourth UE (UE4) have latency requirements of 50 ms, and fifth UE (UE5) and sixth UE (UE6) have latency require-ments of 100 ms, the RSU 205, in one example, may allocate resources in the virtual frames as follow:

TABLE 1

| Virtual Frames | UE Sequence |
| --- | --- |
| 0 ms-10 ms | UE1 |
| 10 ms-20 ms | UE2, UE3 |
| 20 ms-30 ms | UE1, UE 5 |
| 30 ms-40 ms | UE2, U4 |
| 40 ms-50 ms | UE 1 |
| 50 ms-60 ms | UE 2 |
| 60 ms-70 ms | UE1, UE3 |
| 70 ms-80 ms | UE2, UE6 |
| 80 ms-90 ms | UE1, UE4 |
| 90 ms-100 ms | UE2 |

In the above example, UEs that have packets for transmission may transmit in the TTI corresponding to the allocated virtual frame of the resource pool. However, if a UE (e.g., UE 2 in fourth virtual frame (30 ms-40 ms)) does not have a packet for transmission at the time, the fourth UE (UE4) may recognize absence of any transmission based on the a gap in resources that may indicate that resources are not utilized. As such, if the allocated resource is not being utilized, the subsequent UE that has been allocated that resource may occupy the allocated resource for transmission. Thus, in such manner, RSU 205 may implement priority transmissions for UEs 104 to prioritize low latency, high priority traffic.

Figure 5C:
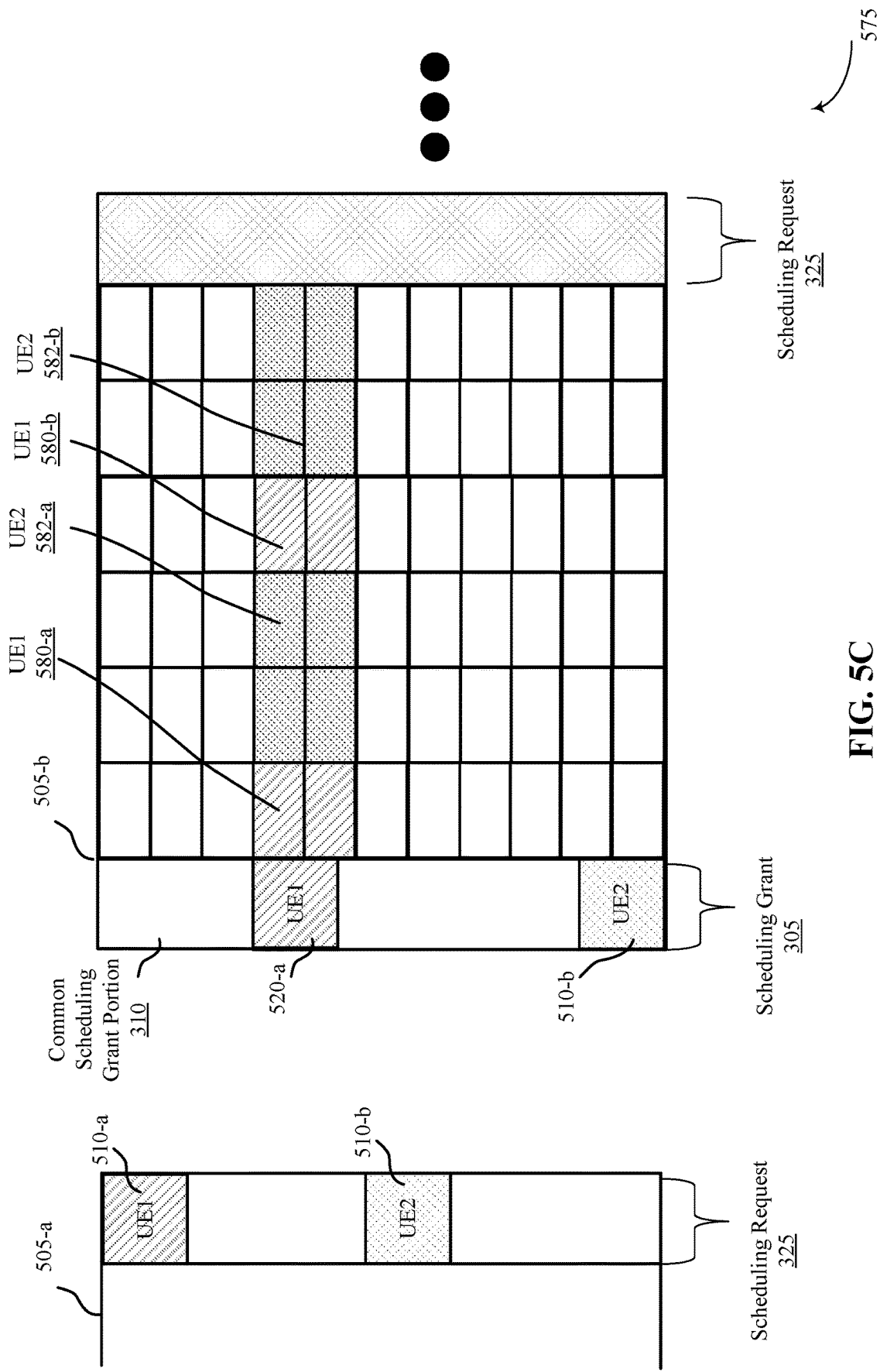

FIG. 5C is another example of a diagram 575 of scheduling resources for side-link communication by RSU for various traffic patterns. Specifically, for fixed packet size packets with low latency (e.g., 5 ms) packets, the RSU 205 may allocate multiple resources to one or more UEs 104 in the resource pool 320 in order to maintain tight quality of service (QoS) requirements. For example, with respect to the first UE 104-a, the RSU 205 may allocate a first set of resources 580-a and a second set of resources 580-b in the resource pool of the same frame. Similarly, the RSU 205 may allocate different first set of resources 582-a and a second set of resources 582-b in the resource pool of the same frame to the second UE 104-b. The periodicity of the first set and the second set of resources may be adjusted within the frame itself. However, by providing non-continuous resources within the resource pool, the RSU 205 is able to maintain a tight QoS for the UEs 104 with low latency (e.g., less than latency threshold) requirements.

Figure 5D:
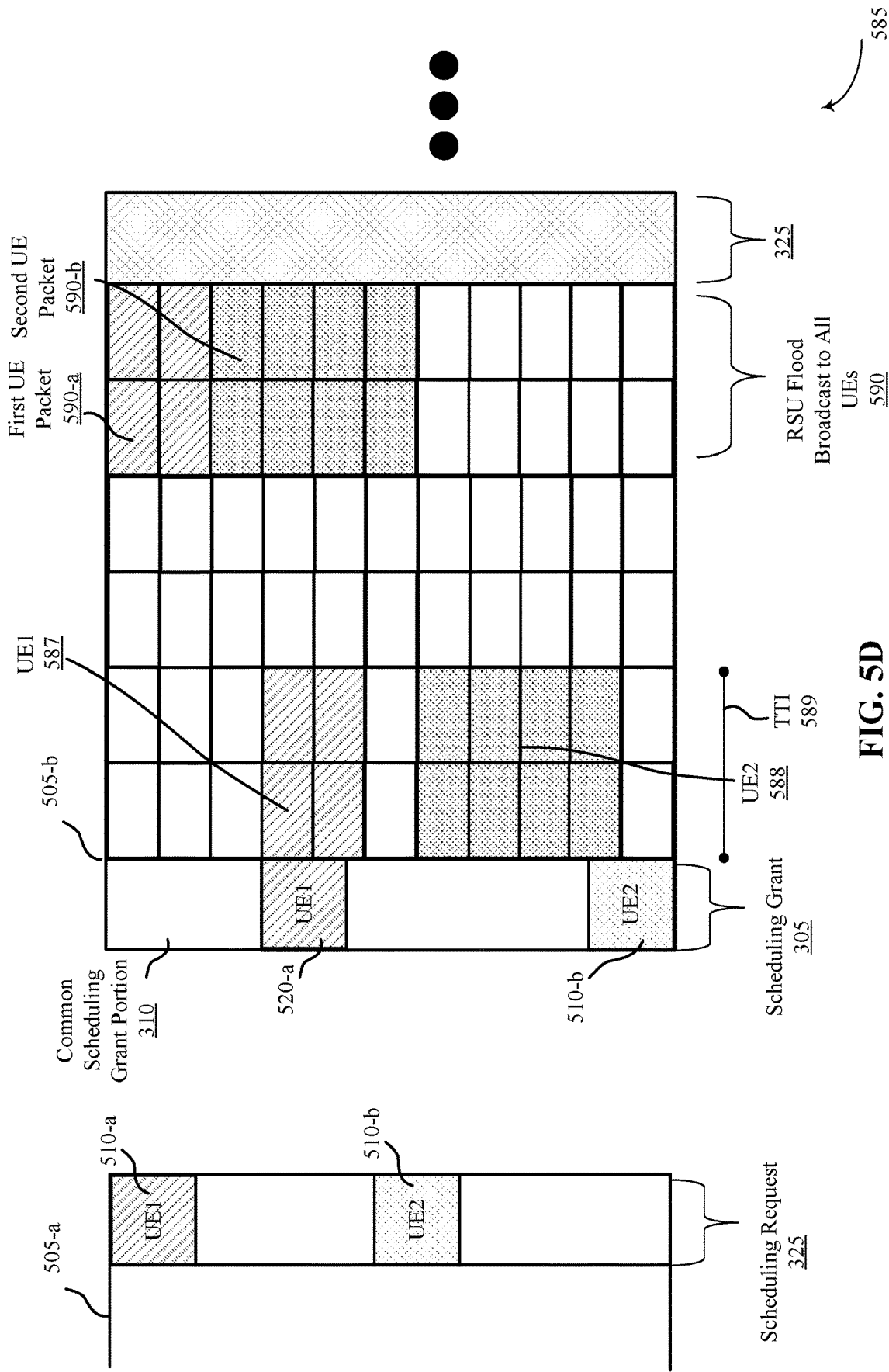

FIG. 5D is another example of a diagram 585 of scheduling resources for side-link communication by RSU for various traffic patterns. Specifically, diagram 585 illustrates an example of overcoming the half-duplex constraints when the RSU 205 is forced to allocate resources to one or more UEs 104 during the same TTI. Specifically, in some instances, one or more UEs 104 may issue scheduling requests for variable packet sizes with low latency requirements (e.g., 5 ms). In order to satisfy the tight QoS requirements, the RSU 205, in some instances, may allocate a first set of resources 587 to the first 104-a during the first TTI 589 and a second set of resources 588 in the different frequency sub-bands, but during the same first TTI 589 to the second UE 104-b. As such, when the first UE 104-a and the second UE 104-b both transmit their respective packets during the first TTI 589, neither UE 104 (e.g., first UE 104-a or second UE 104-b) would be able to hear or receive signals from the other UE's transmission. This is because, in the limited scenario, RSU 205 failed to satisfy the half-duplex constraints.

However, in order to overcome the above-identified limitation, features of the present disclosure provide techniques that allow the RSU 205 to hear the transmissions from both the first UE 104-a and the second UE 104-b during the first TTI 589, and rebroadcast both the first UE packet 590-a and the second UE packet 590-b at a later portion of the resource pool during a second TTI. Because the RSU 205 may broadcast all the packets, any UE 104 that may have failed to receive packets at an earlier time (e.g., due to its own concurrent transmissions), may be able to receive and decode the packets transmitted by the other UE 104. Thus, in such instance, the first UE 104-a may receive the packets transmitted by the second UE 104-b, and the second UE 104-b may receive the packets transmitted by the first UE 104-a via the RSU 205, while the RSU 205 is able to satisfy the tight QoS requirements.

Figure 6:
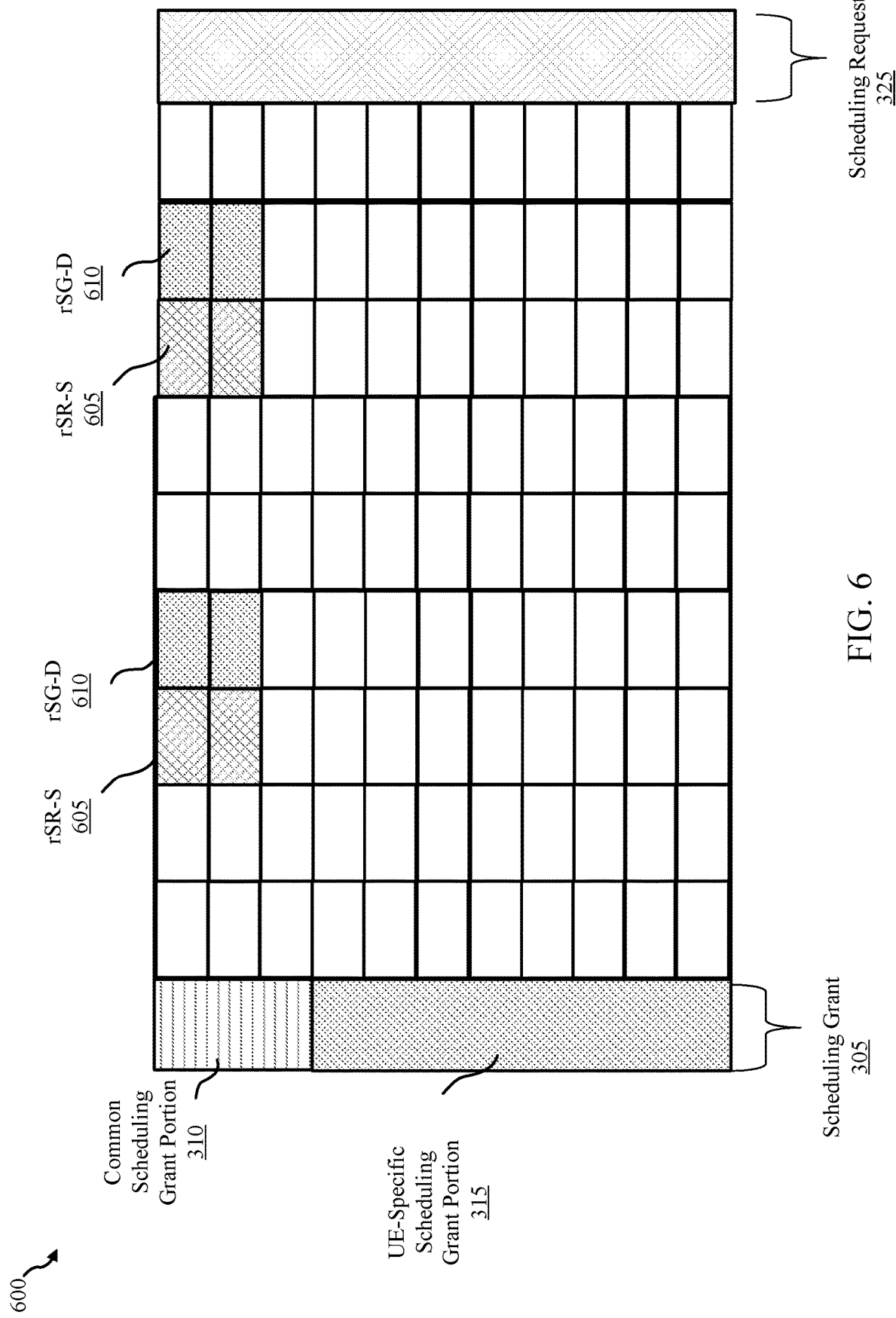
FIG. 6 is an example of a modified RSU scheduling frame structure that may be implemented by an RSU to accommodate one or more UEs with low latency requirements.

FIG. 6 is an example of a modified RSU scheduling frame structure 600 that may be implemented by an RSU 205 to accommodate one or more UEs 104 with low latency requirements. Specifically, in some instances, the RSU 205 may receive scheduling requests from one or more UEs 104 (e.g., a group of UEs) that require low latency (e.g., urgent packets). For such UEs 104, it may not be sufficient to wait the entire length of a frame to request new resources. As such, for some low latency UEs 104, a single scheduling request period (e.g., scheduling request 325 TTI) and a single scheduling grant 305 period that may be available for each frame may be insufficient.

In order to accommodate such low latency UEs 104, the UEs 104 may issue a scheduling request to the RSU 205 that identifies a first group of UEs (collectively "low latency UEs") as having low latency requirements for side-link communications. In turn, the RSU 205 may modify the RSU scheduling frame structure 600 to accommodate the low latency group of UEs 104 (e.g., first group of UEs 104) by configuring a portion of the resource pool (e.g., one or more frequency sub-bands) to be made available for the low latency UEs 104 to request and receive scheduling grants inter-frame. Specifically, in addition to the scheduling grant 305 that includes the common scheduling grant portion 310 and the UE-Specific scheduling grant portion 315, the modified RSU scheduling frame structure 600 may include additional slots for UEs 104 to issue resource scheduling requests (rSRs) 605 and slots for UE-dedicated resource scheduling grants 610 (rSG-D). Thus, in such instances, the rSR-S 605 and rSG-D 610 may be transmitted more frequently than the rSG-Common 310 for each frame in order to meet the strict latency requirements as well as packet size requirements indicated in the rSR by the UEs.

Figure 7:
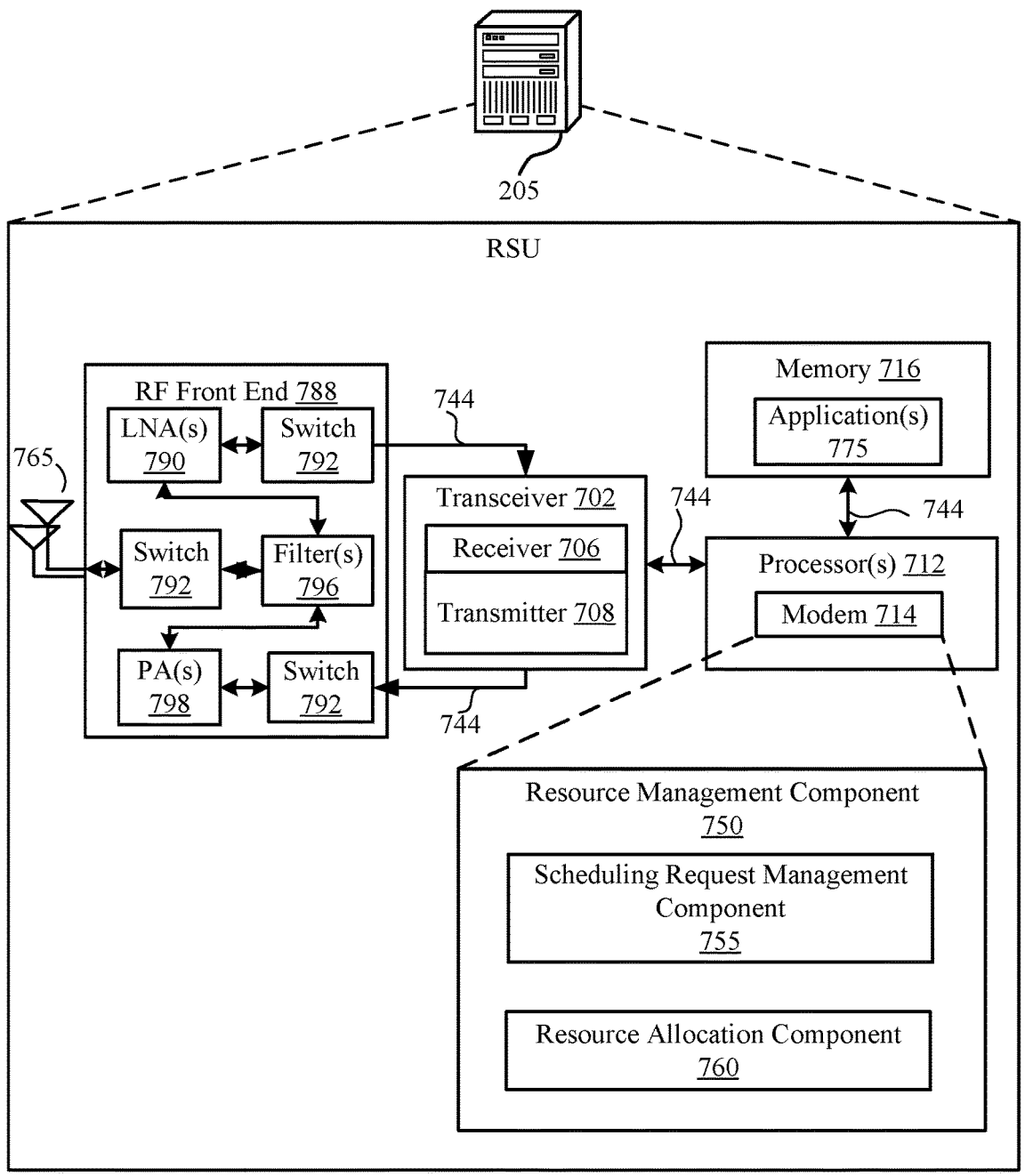
FIG. 7 illustrates a hardware components and subcomponents of an example RSU for implementing one or more methods described herein in accordance with various aspects of the present disclosure.

FIG. 7 illustrates a hardware components and subcomponents of a RSU 205 for implementing one or more methods (e.g., methods 800, 900, and 1000) described herein in accordance with various aspects of the present disclosure. For example, one example of an implementation of the RSU 205 may include a variety of components, some of which have already been described above, but including components such as one or more processors 712, memory 716 and transceiver 702 in communication via one or more buses 744, which may operate in conjunction with the resource management component 750 to perform functions described herein related to including one or more methods (e.g., methods 800, 900, and 1000) of the present disclosure. In some examples, the RSU 205 may be a standalone user equipment (e.g., IoT device) or another UE 104 in a vehicle. In other words, in some instances, a UE 104 may also act as a RSU 205 for purposes of scheduling communication for one or more UEs for side-link CV2X communication. Additionally or alternatively, the RSU 104 may communicate with one or more base stations 102 or other UEs 104 wirelessly via antennas 765.

The one or more processors 712, modem 710, memory 716, transceiver 702, RF front end 788 and one or more antennas 765, may be configured to support voice and/or data calls (simultaneously or non-simultaneously) in one or more radio access technologies. In an aspect, the one or more processors 712 can include a modem 714 that uses one or more modem processors. The various functions related to the resource management component 750 may be included in modem 714 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with resource management component 450 may be performed by transceiver 702.

In some examples, the resource management component 750 may include scheduling requesting management component 755 for receiving and processing scheduling requests from one or more UEs 104 and issuing scheduling grants. Additionally or alternatively, the resource management component 750 may include resource allocation component 760 for allocating resources in the resource pool to the one or more UEs to ensure compliance with half-duplex constraints.

The memory 716 may be configured to store data used herein and/or local versions of application(s) 715 or resource management component 750 and/or one or more of its subcomponents being executed by at least one processor 712. The memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, the memory 716 may be a non-transitory computer-readable storage medium that stores one or more computer-executable codes defining resource management component 750 and/or one or more of its subcomponents, and/or data associated therewith, when the UE 104 is operating at least one processor 712 to execute resource management component 750 and/or one or more of its subcomponents.

The transceiver 702 may include at least one receiver 706 and at least one transmitter 708. The receiver 706 may include hardware, firmware, and/or software code executable by a processor for receiving data, the code comprising instructions and being stored in a memory (e.g., computer-readable medium). The receiver 706 may be, for example, a radio frequency (RF) receiver. In an aspect, the receiver 706 may receive signals transmitted by at least one UE 104. Additionally, receiver 706 may process such received signals, and also may obtain measurements of the signals, such as, but not limited to, Ec/Io, SNR, RSRP, RSSI, etc. The transmitter 708 may include hardware, firmware, and/or software code executable by a processor for transmitting data, the code comprising instructions and being stored in a memory (e.g., computer-readable medium). A suitable example of the transmitter 708 may including, but is not limited to, an RF transmitter.

Moreover, in an aspect, transmitting device may include the RF front end 788, which may operate in communication with one or more antennas 765 and transceiver 702 for receiving and transmitting radio transmissions, for example, wireless communications transmitted by at least one UE 104. The RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, the LNA 790 can amplify a received signal at a desired output level. In an aspect, each LNA 790 may have a specified minimum and maximum gain values. In an aspect, the RF front end 788 may use one or more switches 792 to select a particular LNA 790 and its specified gain value based on a desired gain value for a particular application.

Further, for example, one or more PA(s) 798 may be used by the RF front end 788 to amplify a signal for an RF output at a desired output power level. In an aspect, each PA 798 may have specified minimum and maximum gain values. In an aspect, the RF front end 788 may use one or more switches 792 to select a particular PA 798 and its specified gain value based on a desired gain value for a particular application.

Also, for example, one or more filters 796 can be used by the RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, the RF front end 788 can use one or more switches 792 to select a transmit or receive path using a specified filter 796, LNA 790, and/or PA 798, based on a configuration as specified by the transceiver 702 and/or processor 712.

As such, the transceiver 702 may be configured to transmit and receive wireless signals through one or more antennas 765 via the RF front end 788. In an aspect, the transceiver 702 may be tuned to operate at specified frequencies such that transmitting device can communicate with, for example, one or more UEs 104 or one or more cells associated with one or more base stations 102. In an aspect, for example, the modem 714 can configure the transceiver 702 to operate at a specified frequency and power level based on the configuration of the transmitting device and the communication protocol used by the modem 714.

In an aspect, the modem 714 can be a multiband-multimode modem, which can process digital data and communicate with the transceiver 702 such that the digital data is sent and received using the transceiver 702. In an aspect, the modem 714 can be multiband and be configured to support multiple frequency bands for a specific communications protocol. In an aspect, the modem 714 can be multimode and be configured to support multiple operating networks and communications protocols. In an aspect, the modem 714 can control one or more components of transmitting device (e.g., RF front end 788, transceiver 702) to enable transmission and/or reception of signals from the network based on a specified modem configuration. In an aspect, the modem configuration can be based on the mode of the modem 714 and the frequency band in use. In another aspect, the modem configuration can be based on UE configuration information associated with transmitting device as provided by the network during cell selection and/or cell reselection.

Figure 8:
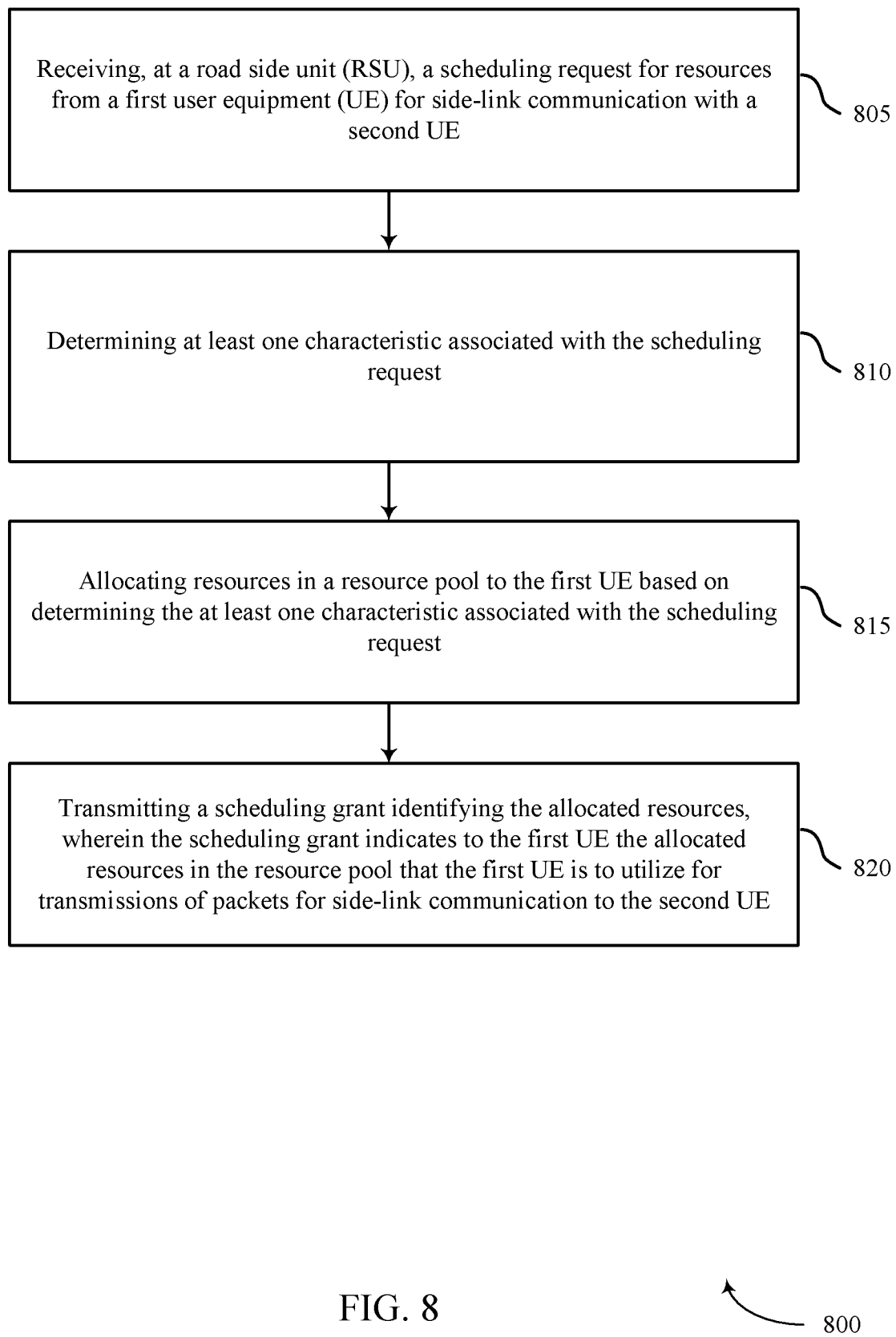
FIG. 8 is a flowchart of an example method for wireless communications in accordance with aspects of the present disclosure.

FIG. 8 is a flowchart of an example method 800 for wireless communications in accordance with aspects of the present disclosure. The method 800 may be performed by a RSU 205 that may be an example of a UE 104. Although the method 800 is described below with respect to the elements of the RSU 205 or UE 104, other components may be used to implement one or more of the steps described herein.

At block 805, the method 800 may include receiving, at a RSU, a scheduling request for resources from a first UE for side-link communication with a second UE. In some examples, the scheduling request from the first UE may be received on a first TTI reserved for one or more UEs to transmit scheduling requests to the RSU. In some examples, the resources reserved for scheduling requests may be part of the tail end of the previous frame such that the RSU may issue scheduling grants for resources in subsequent frame. Thus, as noted below, the scheduling grant may be transmitted by the RSU on a second TTI reserved for transmitting scheduling grants to one or more UEs. In some examples, the resources reserved for the scheduling grant may be one or more first slots in the beginning of a frame. Aspects of block 805 may be performed by transceiver 702 and scheduling request management component 755 described with reference to FIG. 7 above. Thus, with respect to aspects of block 805, the modem 714, the one or more processors 712, the RSU, the scheduling request management component 755 or one of its subcomponents may define the means for receiving, at a RSU, a scheduling request for resources from a first UE for side-link communication with a second UE.

At block 810, the method 800 may include determining at least one characteristic associated with the scheduling request. In some aspects, the at least one characteristic associated with the scheduling request may include one or more of a packet size for transmission by the first UE or latency requirements of the first UE. Specifically, the first UE may request either resources to transmit fixed packet sizes or variable packet sizes. Further, the first UE may have either a low latency requirement (e.g., collision prevention applications may require high priority transmissions to other vehicles). To this end, in some examples, the method may include determining whether the first UE is scheduled to periodically transmit a fixed packet size based on the scheduling request, and allocating a fixed set of resources in the resource pool for a set number of frames (e.g., next 10 frames) based on determining that the first UE is scheduled to periodically transmit fixed packet size. As such, the first UE may omit repeatedly issuing scheduling request for each frame if the RSU determines that for a specified number of subsequent frames the first UE is set to transmit a fixed size packet.

In some aspects, determining the at least one characteristic associated with the scheduling request may comprise determining whether a latency requirements of the first UE satisfies a latency threshold, and modifying RSU scheduling structure for a frame based on the determining that the latency requirements of the first UE are less than the latency threshold (e.g., the first UE has applications that require priority transmissions). In some examples, modifying the RSU scheduling structure includes increasing periodicity of resources reserved for scheduling requests and UE specific scheduling grants within a frame more than a common scheduling grant portions 310.

Further in some instances, to account for low latency requirements of some UEs, the method may include determining that a first UE has a low latency requirement based on the scheduling request, and wherein the first UE has requested transmissions of fixed packet sizes. In such instances, the RSU may allocate a first set of resources in the resource pool of the first frame to the first UE, and allocate a second set of resources in the resource pool of the first frame to the first UE, wherein the first set of resources and the second set of resources are a fixed set of non-continuous resources within same frame. Aspects of block 810 may be performed by resource management component 750 described with reference to FIG. 7 above. Thus, with respect to aspects of block 810, the modem 714, the one or more processors 712, the RSU, the scheduling request management component 750 or one of its subcomponents may define the means for determining at least one characteristic associated with the scheduling request.

At bock 815, the method 800 may include allocating resources in a resource pool to the first UE based on determining the at least one characteristic associated with the scheduling request. In the instance of variable packet sizes, the method may include the RSU determining whether the first UE is scheduled to transmit packets of variable sizes based on the scheduling request, and allocating a first set of resources in the resource pool based on determining that the first UE is scheduled to transmit packets of variable sizes. In some instances, the RSU may further receive requests from multiple UEs for resources to transmit packets of variable sizes generally during the same TTI as the first request from the first UE. For example, the method may include receiving, at the RSU, a second scheduling request from the second UE for side-link communication. The method may further include determining that the second UE is scheduled to transmit packets of variable sizes based on the second scheduling request. As such, the method may include allocating a second set of resources in the resource pool for the second UE to transmit packets of variable sizes. In some examples, the first set of resources for the first UE and the second set of resources for the second UE may be ordered in time domain by the RSU to comply with half-duplex constraints. Aspects of block 815 may be performed by resource allocation component 760 described with reference to FIG. 7 above. Thus, with respect to aspects of block 815, the modem 714, the one or more processors 712, the RSU, the scheduling resource allocation component 760 or one of its subcomponents may define the means for allocating resources in a resource pool to the first UE based on determining the at least one characteristic associated with the scheduling request.

At block 820, the method 800 may include transmitting a scheduling grant identifying the allocated resources, wherein the scheduling grant indicates to the first UE the allocated resources in the resource pool that the first UE may utilize for transmission of packets for side-link communication to the second UE. As noted above, the scheduling grant may be transmitted by the RSU on a second TTI reserved for transmitting scheduling grants to one or more UEs. In some examples, the resources reserved for the scheduling grant may be one or more first slots in the beginning of a frame. In some examples, the second TTI reserved for the scheduling grants includes a first portion that is common for all UEs in coverage area of the RSU (e.g., common scheduling grant portion 310) and a second portion that is UE specific (e.g., UE-specific scheduling grant portion 315). Aspects of block 820 may be performed by transceiver 702 and scheduling request management component 755 described with reference to FIG. 7 above. Thus, with respect to aspects of block 820, the modem 714, the one or more processors 712, the RSU, the request management component 755 or one of its subcomponents may define the means for transmitting a scheduling grant identifying the allocated resources, wherein the scheduling grant indicates to the first UE the allocated resources in the resource pool that the first UE may utilize for transmission of packets for side-link communication to the second UE.

Figure 9:
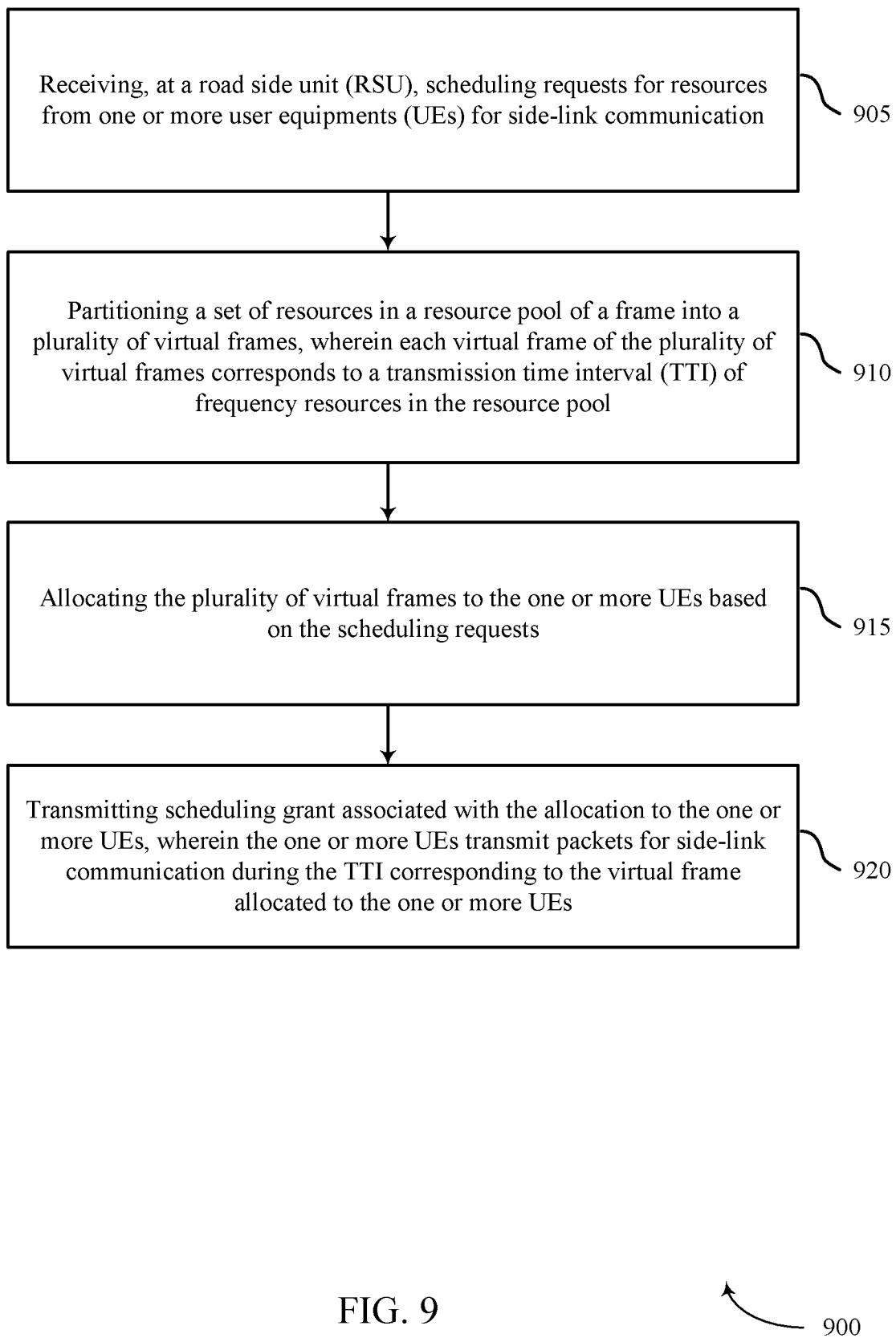
FIG. 9 is a flowchart of another example method for wireless communications in accordance with aspects of the present disclosure.

FIG. 9 is a flowchart of another example method 900 for wireless communications in accordance with aspects of the present disclosure. The method 900 may be performed by a RSU 205 that may be an example of a UE 104. Although the method 900 is described below with respect to the elements of the RSU 205 or UE 104, other components may be used to implement one or more of the steps described herein.

At block 905, the method 900 may include, receiving, at a RSU, scheduling requests for resources from one or more UEs for side-link communications. In some examples, the scheduling requests may be for variable packet sizes from the one or more UEs with variable latency requirements. Aspects of block 905, may be performed by transceiver 702 and scheduling request management component 755 described with reference to FIG. 7 above. Thus, with respect to aspects of block 905, the modem 714, the one or more processors 712, the RSU, the scheduling request management component 755 or one of its subcomponents may define the means for receiving, at a RSU, scheduling requests for resources from one or more UEs for side-link communications.

At block 910, the method 900 may include partitioning a set of resources in a resource pool of a frame into a plurality of virtual frames, wherein each virtual frame of the plurality of virtual frames corresponds to a TTI of frequency resources in the resource pool. Aspects of block 910 may be performed by resource management component 750 described with reference to FIG. 7 above. Thus, with respect to aspects of block 910, the modem 714, the one or more processors 712, the RSU, the resource management component 750 or one of its subcomponents may define the means for partitioning a set of resources in a resource pool of a frame into a plurality of virtual frames, wherein each virtual frame of the plurality of virtual frames corresponds to a TTI of frequency resources in the resource pool.

At block 915, the method 900 may include allocating the plurality of virtual frames to the one or more UEs based on the scheduling requests. In some examples, allocating the plurality of virtual frames to the one or more UEs may include determining a latency requirements of the one or more UEs based on the scheduled requests received at the RSU, and ordering allocation of the resources in the resource pool to the one or more UEs based in part on the latency requirements of the one or more UEs. Aspects of block 915 may be performed by resource allocation component 760 described with reference to FIG. 7 above. Thus, with respect to aspects of block 915, the modem 714, the one or more processors 712, the RSU, the resource allocation component 760 or one of its subcomponents may define the means for allocating the plurality of virtual frames to the one or more UEs based on the scheduling requests.

At block 920, the method 900 may include transmitting scheduling grant associated with the allocation to the one or more UEs, wherein the scheduling grant indicates to the one or more UEs the virtual frame allocated to the one or more UEs for side-link communication. Aspects of block 920 may be performed by transceiver 702 and scheduling request management component 755 described with reference to FIG. 7 above. Thus, with respect to aspects of block 920, the modem 714, the one or more processors 712, the RSU, the scheduling request management component 755 or one of its subcomponents may define the means for transmitting scheduling grant associated with the allocation to the one or more UEs, wherein the scheduling grant indicates to the one or more UEs the virtual frame allocated to the one or more UEs for side-link communication.

Figure 10:
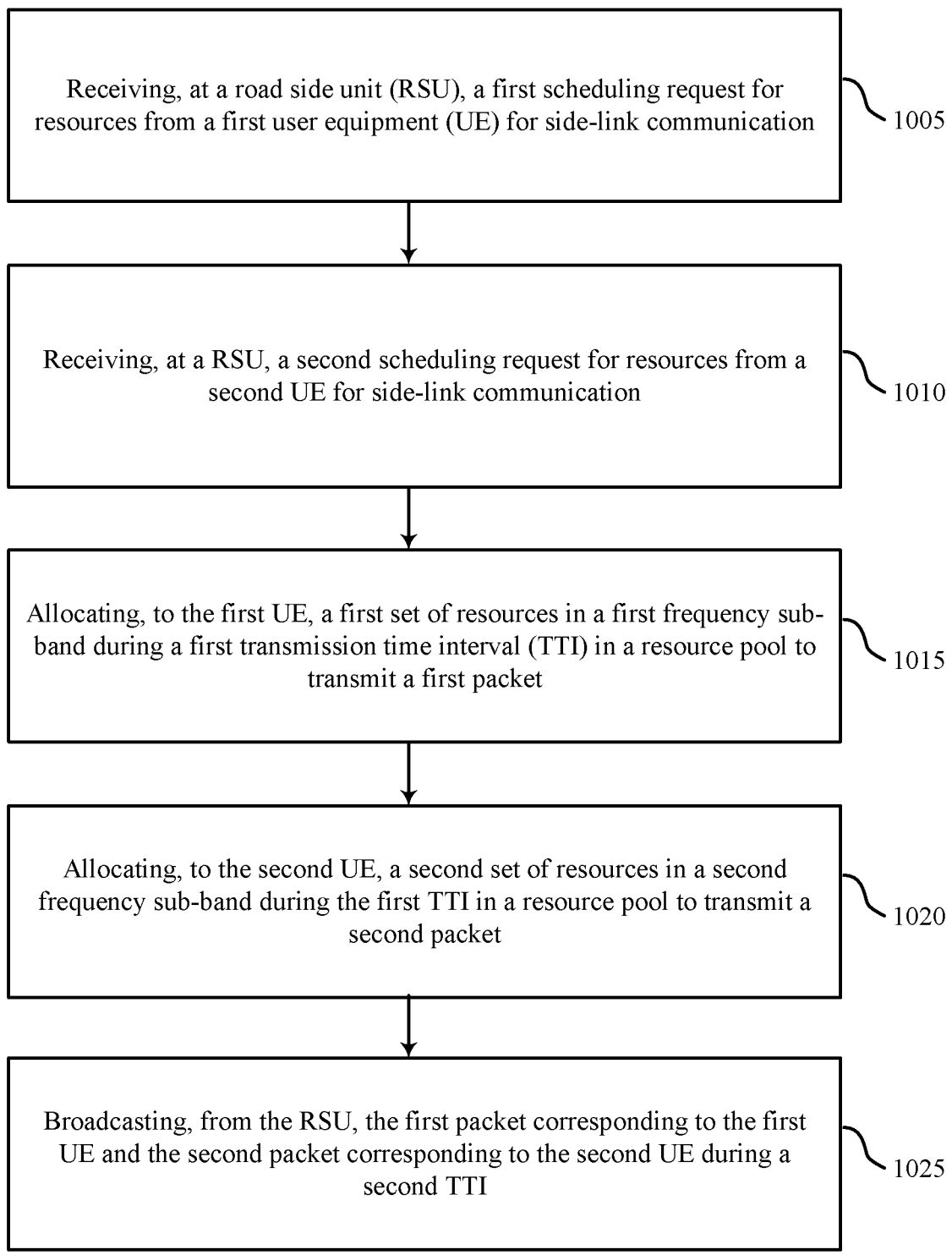
FIG. 10 is a flowchart of another example method for wireless communications in accordance with aspects of the present disclosure.

FIG. 10 is a flowchart of another example method 1000 for wireless communications in accordance with aspects of the present disclosure. The method 1000 may be performed by a RSU 205 that may be an example of a UE 104. Although the method 1000 is described below with respect to the elements of the RSU 205 or UE 104, other components may be used to implement one or more of the steps described herein.

At block 1005, the method 1000 may include receiving, at a RSU, a first scheduling request for resources from a first UE for side-link communication. Aspects of block 1005, may be performed by transceiver 702 and scheduling request management component 755 described with reference to FIG. 7 above.

At block 1010, the method 1000 may include receiving, at a RSU, a second scheduling request for resources from a second UE for side-link communication. Aspects of block 1010, may be performed by transceiver 702 and scheduling request management component 755 described with reference to FIG. 7 above.

At block 1015, the method 1000 may include allocating, to the first UE, a first set of resources in a first frequency sub-band during a first TTI in a resource pool to transmit a first packet. Aspects of block 1015 may be performed by resource allocation component 760 described with reference to FIG. 7 above.

At block 1020, the method 1000 may include allocating, to the second UE, a second set of resources in a second frequency sub-band during the first TTI in a resource pool to transmit a second packet. Aspects of block 1020 may be performed by resource allocation component 760 described with reference to FIG. 7 above.

At block 1025, the method 1000 may include broadcasting, from the RSU, the first packet corresponding to the first UE and the second packet corresponding to the second UE during a second TTI. Aspects of block 1025 may be performed by transceiver 702 and scheduling request management component 755 described with reference to FIG. 7 above.

Some Further Example Implementations

An example method for wireless communications, comprising: receiving, at a road side unit (RSU), a scheduling request for resources from a first user equipment (UE) for side-link communication with a second UE; determining at least one characteristic associated with the scheduling request; allocating resources in a resource pool to the first UE based on determining the at least one characteristic associated with the scheduling request; and transmitting a scheduling grant identifying the allocated resources, wherein the scheduling grant indicates to the first UE the allocated resources in the resource pool that the first UE is to utilize for transmissions of packets for side-link communication to the second UE.

The above example, wherein the at least one characteristic associated with the scheduling request includes one or more of a packet size for transmission by the first UE or latency requirements of the first UE.

Any of the above example methods, wherein determining the at least one characteristic associated with the scheduling request comprises: determining whether the first UE is scheduled to transmit a fixed packet size or a variable packet size based on the scheduling request; and allocating a fixed set of resources in the resource pool for a set number of frames based on determining that the first UE is scheduled to periodically transmit fixed packet size.

Any of the above example methods, wherein determining the at least one characteristic associated with the scheduling request comprises: determining whether the first UE is scheduled to transmit a fixed packet size or a variable packet size based on the scheduling request; and allocating a first set of resources in the resource pool based on determining that the first UE is scheduled to transmit packets of variable sizes.

Any of the above example methods, further comprising: receiving, at the RSU, a second scheduling request from the second UE for side-link communication; determining that the second UE is scheduled to transmit packets of variable sizes based on the second scheduling request; and allocating a second set of resources in the resource pool for the second UE to transmit packets of variable sizes.

Any of the above example methods, wherein the first set of resources for the first UE and the second set of resources for the second UE are ordered in time domain by the RSU to comply with half-duplex constraints.

Any of the above example methods, wherein the scheduling request from the first UE is received on a first transmission time interval (TTI) reserved for one or more UEs to transmit scheduling requests to the RSU.

Any of the above example methods, wherein the scheduling grant is transmitted by the RSU on a second transmission time interval (TTI) reserved for transmitting scheduling grants to one or more UEs.

Any of the above example methods, wherein the second TTI reserved for the scheduling grants includes a first portion that is common for all UEs in coverage area of the RSU and a second portion that is UE specific.

Any of the above example methods, wherein determining the at least one characteristic associated with the scheduling request comprises: determining whether a latency requirements of the first UE satisfies a latency threshold; and modifying RSU scheduling structure for a frame based on the determining that the latency requirements of the first UE are less than the latency threshold.

Any of the above example methods, wherein modifying the RSU scheduling structure includes increasing periodicity of resources reserved for scheduling requests and UE specific scheduling grants within a frame.

Any of the above example methods, wherein determining the at least one characteristic associated with the scheduling request comprises: determining that a first UE has a low latency requirement based on the scheduling request, wherein the scheduling request further indicates that the first UE is requesting transmission of packets with a fixed packet size.

Any of the above example methods, further comprising: allocating a first set of resources in the resource pool of the first frame to the first UE; and allocating a second set of resources in the resource pool of the first frame to the first UE, wherein the first set of resources and the second set of resources are a fixed set of non-continuous resources within same frame.

An example apparatus for wireless communications, comprising: a memory configured to store instructions; a processor communicatively coupled with the memory, the processor configured to execute the instructions to: receive, at a road side unit (RSU), a scheduling request for resources from a first user equipment (UE) for side-link communication with a second UE; determine at least one characteristic associated with the scheduling request; allocate resources in a resource pool to the first UE based on determining the at least one characteristic associated with the scheduling request; and transmit a scheduling grant identifying the allocated resources, wherein the scheduling grant indicates to the first UE the allocated resources in the resource pool that the first UE is to utilize for transmissions of packets for side-link communication to the second UE.

The above example apparatus, wherein the at least one characteristic associated with the scheduling request includes one or more of a packet size for transmission by the first UE or latency requirements of the first UE.

Any of the above example apparatus, wherein the instructions to determine the at least one characteristic associated with the scheduling request further include instructions to: determining whether the first UE is scheduled to transmit a fixed packet size or a variable packet size based on the scheduling request; and allocate a fixed set of resources in the resource pool for a set number of frames based on determining that the first UE is scheduled to periodically transmit fixed packet size.

Any of the above example apparatus, wherein the instructions to determine the at least one characteristic associated with the scheduling request further include instructions to: determine whether the first UE is scheduled to transmit a fixed packet size or a variable packet size based on the scheduling request; and allocate a first set of resources in the resource pool based on determining that the first UE is scheduled to transmit packets of variable sizes.

Any of the above example apparatus, wherein the processor is further configured to execute the instructions to: receive, at the RSU, a second scheduling request from the second UE for side-link communication; determine that the second UE is scheduled to transmit packets of variable sizes based on the second scheduling request; and allocate a second set of resources in the resource pool for the second UE to transmit packets of variable sizes.

Any of the above example apparatus, wherein the first set of resources for the first UE and the second set of resources for the second UE are ordered in time domain by the RSU to comply with half-duplex constraints.

Any of the above example apparatus, wherein the scheduling request from the first UE is received on a first transmission time interval (TTI) reserved for one or more UEs to transmit scheduling requests to the RSU.

Any of the above example apparatus, wherein the scheduling grant is transmitted by the RSU on a second transmission time interval (TTI) reserved for transmitting scheduling grants to one or more UEs.

Any of the above example apparatus, wherein the second TTI reserved for the scheduling grants includes a first portion that is common for all UEs in coverage area of the RSU and a second portion that is UE specific.

Any of the above example apparatus, wherein the instructions to determine the at least one characteristic associated with the scheduling request further include instructions to: determine whether a latency requirements of the first UE satisfies a latency threshold; and modify RSU scheduling structure for a frame based on the determining that the latency requirements of the first UE are less than the latency threshold.

Any of the above example apparatus, wherein modifying the RSU scheduling structure includes increasing periodicity of resources reserved for scheduling requests and UE specific scheduling grants within a frame.

Any of the above example apparatus, wherein the instructions to determine the at least one characteristic associated with the scheduling request further include instructions to: determine that a first UE has a low latency requirement based on the scheduling request, wherein the scheduling request further indicates that the first UE is requesting transmission of packets with a fixed packet size.

Any of the above example apparatus, wherein the processor is further configured to execute the instructions to: allocate a first set of resources in the resource pool of the first frame to the first UE; and allocate a second set of resources in the resource pool of the first frame to the first UE, wherein the first set of resources and the second set of resources are a fixed set of non-continuous resources within same frame.

An example non-transitory computer readable medium storing instructions, executable by a processor, for wireless communications, comprising instructions for: receiving, at a road side unit (RSU), a scheduling request for resources from a first user equipment (UE) for side-link communication with a second UE; determining at least one characteristic associated with the scheduling request; allocating resources in a resource pool to the first UE based on determining the at least one characteristic associated with the scheduling request; and transmitting a scheduling grant identifying the allocated resources, wherein the scheduling grant indicates to the first UE the allocated resources in the resource pool that the first UE is to utilize for transmissions of packets for side-link communication to the second UE.

The above example non-transitory computer readable medium, wherein the at least one characteristic associated with the scheduling request includes one or more of a packet size for transmission by the first UE or latency requirements of the first UE.

Any of the above example non-transitory computer readable medium, wherein the instructions for determining the at least one characteristic associated with the scheduling request further include instructions for: determining whether the first UE is scheduled to transmit a fixed packet size or a variable packet size based on the scheduling request; and allocating a fixed set of resources in the resource pool for a set number of frames based on determining that the first UE is scheduled to periodically transmit fixed packet size.

An example apparatus for wireless communications, comprising: means for receiving, at a road side unit (RSU), a scheduling request for resources from a first user equipment (UE) for side-link communication with a second UE; means for determining at least one characteristic associated with the scheduling request; means for allocating resources in a resource pool to the first UE based on determining the at least one characteristic associated with the scheduling request; and means for transmitting a scheduling grant identifying the allocated resources, wherein the scheduling grant indicates to the first UE the allocated resources in the resource pool that the first UE is to utilize for transmissions of packets for side-link communication to the second UE.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
  receiving, at a road side unit (RSU), a scheduling request for resources directly from a first user equipment (UE) for side-link communication with a second UE;
  determining, at the RSU, at least one characteristic associated with the scheduling request, the at least one characteristic associated with the scheduling request includes latency requirements of the first UE for transmitting directly from the first UE to the second UE via side-link communication, the determining comprises modifying RSU scheduling frame structure in response to the latency requirements of the first UE satisfying a latency threshold;
allocating, at the RSU, resources in a resource pool to the first UE for the side-link communication with the second UE based on determining the at least one characteristic associated with the scheduling request; and
transmitting, directly from the RSU to the first UE using the modified RSU scheduling frame structure, a scheduling grant identifying the allocated resources, wherein the scheduling grant indicates to the first UE the allocated resources in the resource pool that the first UE is to utilize for transmissions of packets for side-link communication directly from the first UE to the second UE.

2. The method of claim 1, wherein determining the at least one characteristic associated with the scheduling request comprises:
allocating a fixed set of resources in the resource pool for a set number of frames in response to determining that the first UE is scheduled to periodically transmit packets of fixed packet size.

3. The method of claim 1, wherein determining the at least one characteristic associated with the scheduling request comprises:
allocating a first set of resources in the resource pool in response to determining that the first UE is scheduled to transmit packets of variable sizes.

4. The method of claim 3, further comprising:
receiving, at the RSU, a second scheduling request directly from the second UE for side-link communication;
determining that the second UE is scheduled to transmit packets of variable sizes based on the second scheduling request; and
allocating a second set of resources in the resource pool for the second UE to transmit the packets of variable sizes directly to the first UE.

5. The method of claim 4, wherein the first set of resources for the first UE and the second set of resources for the second UE are ordered in time domain by the RSU to comply with half-duplex constraints.

6. The method of claim 1, wherein the scheduling request from the first UE is received on a first transmission time interval (TTI) reserved for one or more UEs to transmit scheduling requests to the RSU.

7. The method of claim 6, wherein the scheduling grant is transmitted by the RSU on a second transmission time interval (TTI) reserved for transmitting scheduling grants to one or more UEs.

8. The method of claim 7, wherein the second TTI reserved for the scheduling grants includes a first portion that is common for all UEs in coverage area of the RSU and a second portion that is UE specific.

9. The method of claim 1, wherein modifying the RSU scheduling structure includes increasing periodicity of resources reserved for scheduling requests and UE specific scheduling grants within a frame.

10. The method of claim 1, wherein the scheduling request further indicates that the first UE is requesting transmission of packets with a fixed packet size.

11. The method of claim 10, further comprising:
allocating a first set of resources in the resource pool of a first frame to the first UE; and
allocating a second set of resources in the resource pool of the first frame to the first UE, wherein the first set of resources and the second set of resources are a fixed set of non-continuous resources within same frame.

12. The method of claim 1, wherein the at least one characteristic associated with the scheduling request includes a packet size for transmission by the first UE.

13. A road side unit (RSU) for wireless communications, comprising:
a memory configured to store instructions; and
a processor communicatively coupled with the memory, the processor configured to execute the instructions to:
receive, at the RSU, a scheduling request for resources directly from a first user equipment (UE) for side-link communication with a second UE;
determine, at the RSU, at least one characteristic associated with the scheduling request, the at least one characteristic associated with the scheduling request includes latency requirements of the first UE for transmitting directly from the first UE to the second UE via side-link communication, the determining comprises modifying RSU scheduling frame structure in response to the latency requirements of the first UE satisfying a latency threshold;
allocate, at the RSU, resources in a resource pool to the first UE for the side-link communication with the second UE based on determining the at least one characteristic associated with the scheduling request; and
transmit, directly from the RSU to the first UE using the modified RSU scheduling frame structure, a scheduling grant identifying the allocated resources, wherein the scheduling grant indicates to the first UE the allocated resources in the resource pool that the first UE is to utilize for transmissions of packets for side-link communication directly from the first UE to the second UE.

14. The RSU of claim 13, wherein the instructions to determine the at least one characteristic associated with the scheduling request further include instructions to:
allocate a fixed set of resources in the resource pool for a set number of frames in response to determining that the first UE is scheduled to periodically transmit packets of fixed packet size.

15. The RSU of claim 13, wherein the instructions to determine the at least one characteristic associated with the scheduling request further include instructions to:
allocate a first set of resources in the resource pool in response to determining that the first UE is scheduled to transmit packets of variable sizes.

16. The RSU of claim 15, wherein the processor is further configured to execute the instructions to:
receive, at the RSU, a second scheduling request directly from the second UE for side-link communication;
determine that the second UE is scheduled to transmit packets of variable sizes based on the second scheduling request; and
allocate a second set of resources in the resource pool for the second UE to transmit the packets of variable sizes directly to the first UE.

17. The RSU of claim 16, wherein the first set of resources for the first UE and the second set of resources for the second UE are ordered in time domain by the RSU to comply with half-duplex constraints.

18. The RSU of claim 13, wherein the scheduling request from the first UE is received on a first transmission time interval (TTI) reserved for one or more UEs to transmit scheduling requests to the RSU.

19. The RSU of claim 18, wherein the scheduling grant is transmitted by the RSU on a second transmission time interval (TTI) reserved for transmitting scheduling grants to one or more UEs.

20. The RSU of claim 19, wherein the second TTI reserved for the scheduling grants includes a first portion that is common for all UEs in coverage area of the RSU and a second portion that is UE specific.

21. The RSU of claim 13, wherein modifying the RSU scheduling structure includes increasing periodicity of resources reserved for scheduling requests and UE specific scheduling grants within a frame.

22. The RSU of claim 13, wherein the scheduling request further indicates that the first UE is requesting transmission of packets with a fixed packet size.

23. The RSU of claim 22, wherein the processor is further configured to execute the instructions to:
  allocate a first set of resources in the resource pool of a first frame to the first UE; and
  allocate a second set of resources in the resource pool of the first frame to the first UE, wherein the first set of resources and the second set of resources are a fixed set of non-continuous resources within same frame.

24. The apparatus of claim 13, wherein the at least one characteristic associated with the scheduling request includes a packet size for transmission by the first UE.

25. A non-transitory computer readable medium storing instructions, executable by a processor, for wireless communications, comprising instructions for:
  receiving, at a road side unit (RSU), a scheduling request for resources directly from a first user equipment (UE) for side-link communication with a second UE;
  determining, at the RSU, at least one characteristic associated with the scheduling request, the at least one characteristic associated with the scheduling request includes latency requirements of the first UE for transmitting directly from the first UE to the second UE via side-link communication, the determining comprises modifying RSU scheduling frame structure in response to the latency requirements of the first UE satisfying a latency threshold;
  allocating, at the RSU, resources in a resource pool to the first UE for the side-link communication with the second UE based on determining the at least one characteristic associated with the scheduling request; and
  transmitting, directly from the RSU to the first UE using the modified RSU scheduling frame structure, a scheduling grant identifying the allocated resources, wherein the scheduling grant indicates to the first UE the allocated resources in the resource pool that the first UE is to utilize for transmissions of packets for side-link communication directly from the first UE to the second UE.

26. The non-transitory computer readable medium of claim 25, wherein the instructions for determining the at least one characteristic associated with the scheduling request further include instructions for:
  allocating a fixed set of resources in the resource pool for a set number of frames in response to determining that the first UE is scheduled to periodically transmit packets of fixed packet size.

27. The non-transitory computer readable medium of claim 25, wherein the at least one characteristic associated with the scheduling request includes a packet size for transmission by the first UE.

28. An apparatus for wireless communications, comprising:
  means for receiving, at a road side unit (RSU), a scheduling request for resources directly from a first user equipment (UE) for side-link communication with a second UE;
  means for determining, at the RSU, at least one characteristic associated with the scheduling request, the at least one characteristic associated with the scheduling request includes latency requirements of the first UE for transmitting directly from the first UE to the second UE via side-link communication, the means for determining modifying RSU scheduling frame structure in response to the latency requirements of the first UE satisfying a latency threshold;
  means for allocating, at the RSU, resources in a resource pool to the first UE for the side-link communication with the second UE based on determining the at least one characteristic associated with the scheduling request; and
  means for transmitting, directly from the RSU to the first UE using the modified RSU scheduling frame structure, a scheduling grant identifying the allocated resources, wherein the scheduling grant indicates to the first UE the allocated resources in the resource pool that the first UE is to utilize for transmissions of packets for side-link communication directly from the first UE to the second UE.

29. The apparatus of claim 28, wherein the at least one characteristic associated with the scheduling request includes a packet size for transmission by the first UE.

* * * * *